United States Patent
Culshaw et al.

(10) Patent No.: US 8,214,674 B2
(45) Date of Patent: Jul. 3, 2012

(54) INTEGRATED CIRCUIT HAVING A MICROCONTROLLER UNIT AND METHODS OF CONTROLLING THE OPERATION MODE THEREOF

(75) Inventors: Carl Culshaw, Glasgow (GB); Ross A. Mitchell, Giffnock (GB)

(73) Assignee: Freescale Semiconductor, Inc., Austin, TX (US)

( * ) Notice: Subject to any disclaimer, the term of this patent is extended or adjusted under 35 U.S.C. 154(b) by 468 days.

(21) Appl. No.: 12/446,922

(22) PCT Filed: Oct. 22, 2007

(86) PCT No.: PCT/IB2007/054285
§ 371 (c)(1),
(2), (4) Date: Apr. 23, 2009

(87) PCT Pub. No.: WO2008/050285
PCT Pub. Date: May 2, 2008

(65) Prior Publication Data
US 2010/0241282 A1    Sep. 23, 2010

(30) Foreign Application Priority Data

Oct. 25, 2006 (WO) .................. PCT/IB2006/053931
Oct. 25, 2006 (WO) .................. PCT/IB2006/053933
Oct. 25, 2006 (WO) .................. PCT/IB2006/053934

(51) Int. Cl.
*G06F 1/32* (2006.01)

(52) U.S. Cl. ........................................ 713/323; 713/500
(58) Field of Classification Search .................. 713/300, 713/323, 500; 700/295
See application file for complete search history.

(56) References Cited

U.S. PATENT DOCUMENTS

| | | |
|---|---|---|
| 5,350,407 A | 9/1994 | McClure et al. |
| 6,353,894 B1 | 3/2002 | Pione |
| 7,069,461 B1* | 6/2006 | Chan et al. .................. 713/501 |
| 7,567,098 B2* | 7/2009 | Frew et al. .................. 327/143 |
| 2003/0110403 A1 | 6/2003 | Crutchfield et al. |
| 2005/0094036 A1 | 5/2005 | Tichelaar |

OTHER PUBLICATIONS

PCT Appl. No. PCT/IB2007/054285 Search Report mailed Aug. 28, 2008.

* cited by examiner

Primary Examiner — Glenn A Auve

(57) ABSTRACT

Integrated circuit having a Microcontroller Unit and Methods of Operation therefore. An integrated circuit comprises a microcontroller unit with synchronous logic operably coupled to non-clocked intelligent logic. The non-clocked intelligent logic is arranged to autonomously monitor multiple events associated with an operation of the synchronous logic and, in response thereto, the non-clocked intelligent logic initiates autonomously an alternate operational mode of the microcontroller unit. A method of operating a microcontroller unit is also described.

19 Claims, 15 Drawing Sheets

INTEGRATED CIRCUIT HAVING A MICROCONTROLLER UNIT AND METHODS OF CONTROLLING THE OPERATION MODE THEREOF

FIELD OF THE INVENTION

The invention relates to a single integrated circuit having a microcontroller unit comprising both synchronous logic and non-clocked intelligent logic. The invention is applicable to, but not limited to, one or more of error avoidance, error condition, power management, power supply interruptions in such a microcontroller unit (MCU), providing an integrated, complex interaction between the non clocked intelligent logic and synchronous logic domains.

BACKGROUND OF THE INVENTION

In the field of microcontroller units (MCUs) employing clocked circuits/signals it is known that the synchronous logic circuits introduce limitations with respect to the voltage and temperature operating range dependent upon the clock frequency employed in the MCU. The term synchronous logic circuit generally encompasses any clocked logic circuit where logic signals are propagated through a circuit in response to a plurality of timing signals, such as trigger signals or a variety of clock signals.

In low voltage or high temperature states, during for example MCU initialisation or controlled power down of the MCU, the MCU needs to be maintained in a fully functional state. When clocked (synchronous) logic is used for such functional operations, a specific range of voltage and temperature is specified, with no performance guarantees provided outside of this range. Notably, the guaranteed performance associated with synchronous logic is limited to a narrow supply voltage range. There is therefore a need for the MCU to exhibit deterministic behaviour at a lower voltage than the point at which the MCU is fully operational.

However, it is known that operating conditions of voltage and temperature regularly exist that fall outside of this normal operating range.

Many MCU applications require compliance with stringent safety standards, such as EN60730,which demand deterministic behaviour in all conditions. There is therefore a need for the MCU to exhibit deterministic behaviour at a lower voltage than the point at which the MCU is fully operational. For example, MCUs need to support safety modes during start-up, power down and in response to unexpected external events.

It is known that some techniques exist to minimise risks of incorrect MCU operation at low operating voltages, such as providing a watchdog function or provide low voltage interrupt (LVI) functions. These functions provide some protection, but are known to also suffer the same limitations that the MCU suffers from. For example, if the design of the MCU is based on clock signals, then single point failures are still possible and the operation of the MCU is more or less the same for the watchdog as it is for the rest of the MCU.

United States Patent U.S. Pat. No. 5,350,407 A describes a mechanism to asynchronously control singular events. For example, on Column 3 line 8-52, a use of external asynchronous circuits is used to control a behaviour of a second circuit. All of the circuits are applied at a high system-board level and constitute a very low level of asynchronous control. The decision making process is restricted to a singular analogue event with no 'intelligent' behaviour other that pre-defined and constructed. Furthermore, for example in Column 6 line 53 to column 7, line 22, a use of wakeup circuits is used to initiate operation of the Microcontroller. These circuits are again external to the microcontroller and behave in an 'asynchronous' manner. In addition, for example in Column 9, line 33-line 39, a discussion of a use of a low voltage detector to protect memory operation is provided. Further, for example in Column 10, line 59 to column 11, line 3, a use of a low voltage detector to protect memory and register operation is described. It also describes the interaction of the reset control function.

United States Patent U.S. Pat. No. 5,350,407 A also describes, for example in Column 14, line 22-line 39, a use of a low voltage detector to minimise power supply as the voltage level deteriorates. This helps set different levels of operation for the safe level of the RAM memories. Furthermore, for example in Column 17, line 33 to column 18, line 50, a discussion of a Power on reset operation, and how its behaviour is controlled by an asynchronous state machine, is described. Again the asynchronous logic is outside the microcontroller.

United States Patent Application Publication US 2003/110403 A1 describes a use of a power sharing circuit to match required power against specific load conditions. Intelligent power management exists in many systems today, where loads are monitored and then power scaled accordingly.

Thus, a need exists for an improved MCU and method of operation therefor.

SUMMARY OF THE INVENTION

In accordance with aspects of the invention, there is provided an integrated circuit comprising a microcontroller unit having both synchronising logic and non-clocked intelligent logic and methods of operation therefor, as defined in the appended claims.

Specific embodiments of the inventions are described in the dependent claims.

BRIEF DESCRIPTION OF THE DRAWINGS

Exemplary embodiments of the invention will now be described, by way of example only, with reference to the accompanying drawings, in which.

DESCRIPTION OF EMBODIMENTS OF THE INVENTION

Figure 1:
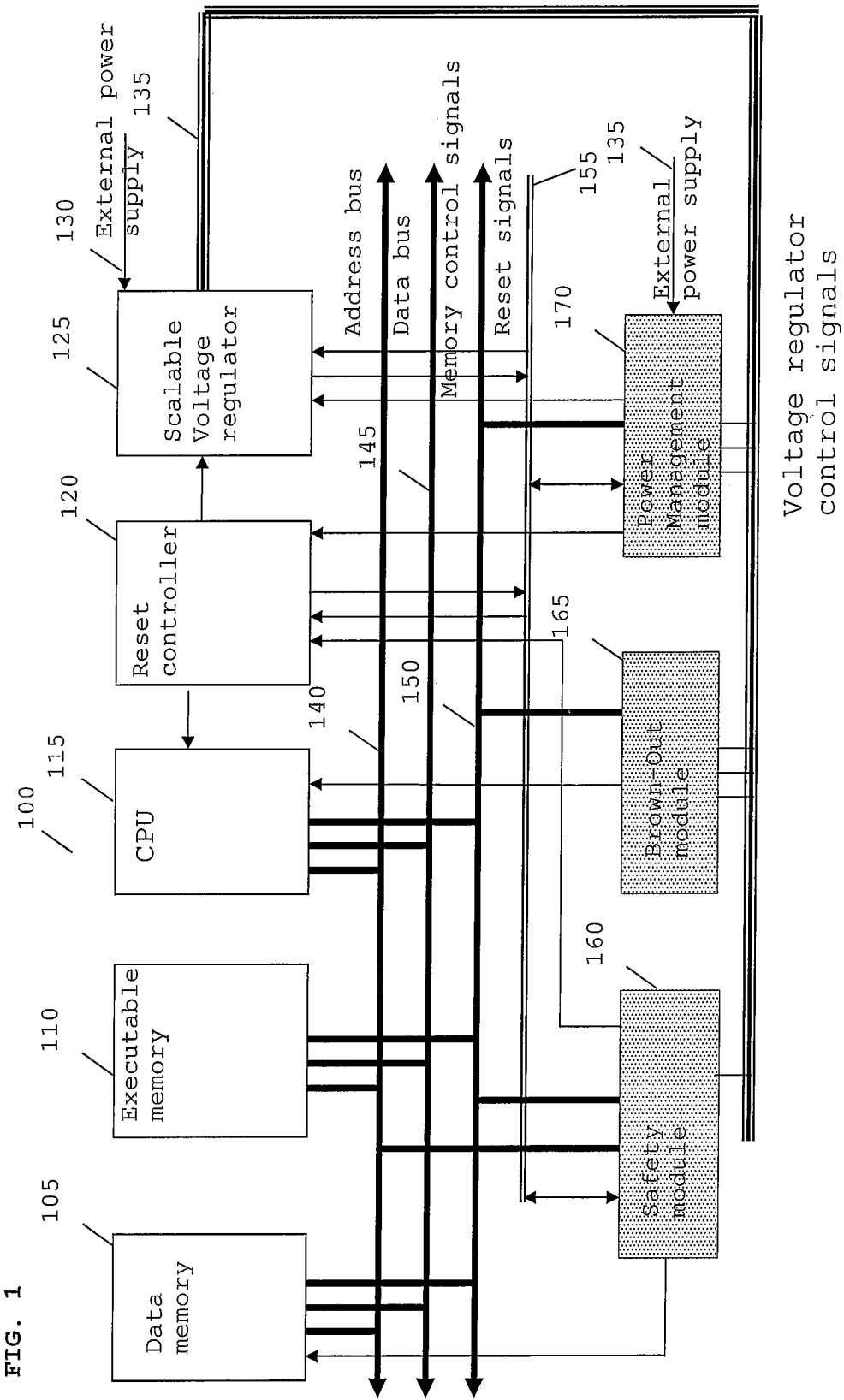
FIG. 1 illustrates a microcontroller unit adapted in accordance with embodiments of the invention.

In a related field of 'asynchronous' event control, it is acknowledged that there is a large number of references related to asynchronous control of singular events, such as asynchronously responding Low Voltage interrupts, Power regulation step changes, etc. Such singular event systems (or similar systems that can only handle a very limited number of events) are referred to as low intelligence systems. In contrast, embodiments of the invention herein described are focused on a significantly more advanced monolithic solution.

In the context of the invention, an 'event' is considered as encompassing a signal that conveys a message or status relating to a change in a system or is a repetitive signal that conveys the current condition of an operational parameter. In the context of this invention, it is envisaged that incoming events may originate from many different sources and locations, but that the multiple events may be combined together with decision logic to generate a specific outcome event. This resultant outgoing event may then be sent to one or more destinations for further decisions to be made by either non-clocked or synchronous logic. Events in non clocked logic are used to move the state of the systems into a new state without the need for a clock signal. Furthermore, it is envisaged that events may be ignored by certain configuration settings and have forced action in other configuration settings.

In accordance with embodiments of the invention, an integrated circuit comprises a microcontroller unit with synchronous logic operably coupled to non-clocked intelligent logic. The non-clocked intelligent logic is arranged to autonomously monitor multiple events associated with an operation of the synchronous logic and, in response thereto, the non-clocked intelligent logic initiates autonomously an alternate operational mode of the microcontroller unit.

In accordance with embodiments of the invention, an integrated circuit comprises a microcontroller unit having synchronous logic operably coupled to a supply voltage source. Non-clocked intelligent power management logic is operably coupled to the supply voltage source and arranged to autonomously control a power-up and/or power-down operation of the microcontroller unit.

Thus, in the aforementioned embodiments, the non-clocked intelligent logic is able to comprise multiple interacting components with complex decision making functionality. In the microcontroller unit, there are multiple connections between the non-clocked intelligent logic and the synchronous logic to provide highly integrated, autonomous operation. Furthermore, the modes of operation controlled by the non-clocked intelligent logic have independence and configurable functionality to provide limited but effective operation outside the normal operational conditions for synchronous logic.

Embodiments of the invention will be described in terms of low power management of a synchronous microcontroller unit (MCU) using non-clocked intelligent logic located within the MCU. Notably, therefore, the inventive concept is wholly contained within a MCU monolithic integrated circuit. It will be appreciated by a skilled artisan that the inventive concept herein described may be embodied in any type of signal processing module or device. Therefore, hereinafter, the term MCU is meant to encompass any signal processing module or device.

It is envisaged that the inventive concept is not limited to use in safety critical applications. It is envisaged that the inventive concept herein described may equally be applied to low power applications and applications to survive regular excursions beyond the normal operating conditions of conventionally clocked logic. It is also envisaged that the inventive concept herein described may equally be applied to applications requiring changes in operating conditions, whilst maintaining gradual change of control to accommodate the change in environment or external MCU conditions.

The inventors of the invention have recognised and appreciated that known MCU designs are limited by their use of synchronous circuits for predominantly all operations. Thus, in summary, the inventors of the invention have proposed to utilise non-clocked intelligent logic circuits for operational conditions where operating conditions may fall outside of the voltage or temperature range limitations imposed by synchronous logic circuits.

The aforementioned limitations are not present with non-clocked intelligent logic designs. Non-clocked intelligent logic does not have an externally generated clock that runs at a standard clock frequency, irrespective of the environment. Furthermore, non-clocked intelligent logic is self-clocked through changing states of the logic. This allows non-clocked intelligent logic to automatically adapt to changing environmental conditions in a way not presently made possible using conventional clocked logic design methodologies or architectures.

Referring now to FIG. 1, a microcontroller unit 100 is illustrated that has been adapted to support embodiments of the invention. The MCU 100 comprises a data memory 105, executable memory 110, a central processing unit (CPU) 115, a reset controller 120 and a scalable voltage regulator 125. The scalable voltage regulator 125 is supplied by an external power supply 130. The data memory 105, executable memory 110, a central processing unit (CPU) 115, a reset controller 120 and a scalable voltage regulator 125 are each designed using conventional clocked logic circuits and controlled using conventional controller functionality. Furthermore, the data memory 105, executable memory 110, a central processing unit (CPU) 115, a reset controller 120 and a scalable voltage regulator 125 are each coupled to address bus 140, data bus 145 and memory bus 150. The reset controller 120 and scalable voltage regulator 125 are also operably coupled to a reset bus 155, for receiving or transmitting reset signals to one or more functional logic circuits. In accordance with embodiments of the invention, one or more of the following logic modules is provided using non-clocked intelligent logic:

Power management module 170;
Brown-out module 165;
Safety module 160.

The one or more Power management module 170, Brown-out module 165 and Safety module 160 are operably coupled to the address bus 140, data bus 145 and memory bus 150. Furthermore, the Power management module 170 is operably coupled to the scaleable voltage regulator 125 and reset controller 120, with the Brown-out module 165 operably coupled to the CPU 115. The Power management module 170, Brown-out module 165 and Safety module 160 also receive voltage regulated signals from the scaleable voltage regulator 125. In addition, the Power management module 170 and Safety module 160 are operably coupled to the reset bus 155. The Safety logic module 160 is operably coupled to the data memory 105 and the reset controller 120. The Power management module 170 receives an external power supply 135.

Thus, in one embodiment of the invention, the non-clocked intelligent logic 160, 165, 170 may allow supervision of the operation of the MCU 100. Notably, the non-clocked intelligent logic does not need a synchronising clock to force a move to the next logical state. In contrast, the non-clocked intelligent logic state machine moves from state to state, entirely through the effects on combinational logic. A key feature of this is the ability of the states to move to the next logical state as soon as the conditions match those required for the progression to the next state. In the context of the invention, a state machine is a concept of logic that moves from state to state, where each transition is controlled and governed by a pre-set rule for each state. Thus, a machine is able to exist in a number of states and move between states. Each state is able to perform a specific function and a complex operation of the machine is performed by an appropriate sequence of states.

Figure 2:
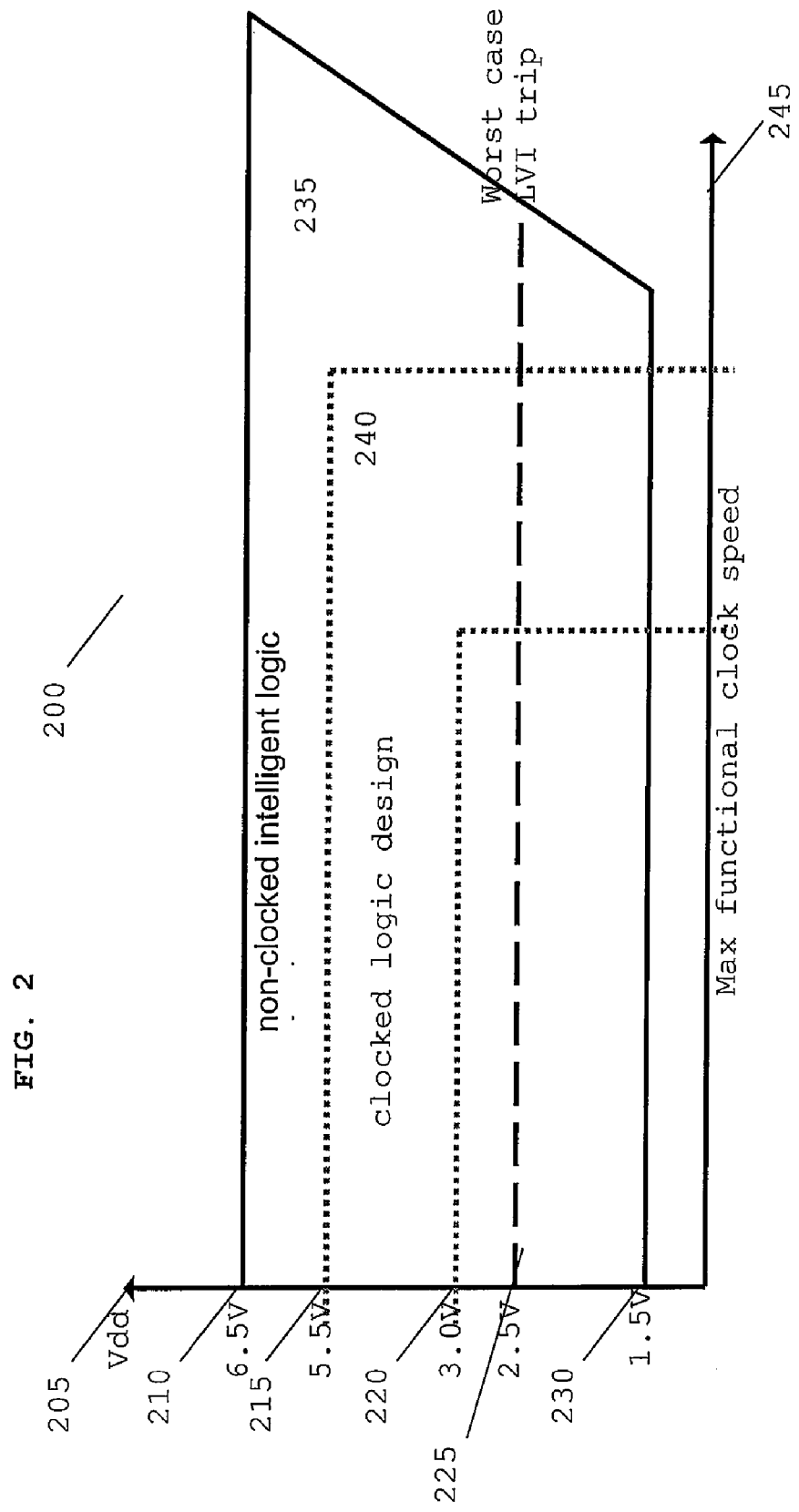
FIG. 2 illustrates a graphical representation of Vdd versus a maximum functional clock speed of the MCU.

Advantageously, as there is no clock needed to validate the state conditions, there is minimal delay in moving to the next state. This may result in one or more of the following advantages:

(i) Speed and voltage range improvement of the MCU. In this regard, the maximum clock speed of a circuit depends upon many parameters, including voltage applied to the transistors (minimum voltage depending upon logic gate design) and temperature (where a high temperature is known to slow the switching speed). Non-clocked designs automatically run at the fastest speed, as illustrated in the graphical representation 200 of FIG. 2. FIG. 2 illustrates Vdd 205 versus a maximum functional clock speed 245. The synchronous circuits operate in a region 240, between 4.5V 220 and 5.5V 215. In contrast, non-clocked intelligent logic circuits are able to operate over an increased region 235 between 2.5V 230 and 6.5V 210, and therefore below a worst case low voltage interface trip of 4.0V 225. The above voltages are indicated for exemplary purposes only. A skilled artisan recognises that each technology would operate with its own specific voltages. However, with all technologies, there is a difference in range of normal operation, with non-clocked intelligent logic always able to accommodate a wider voltage and temperature range than clocked logic due to the automatic adaptation of the rate of state transitions to the current environmental conditions experienced by the non-clocked intelligent logic.

(ii) Power reduction. In this regard, it is known that the clock operation is a constant drain of power, and often runs at a much higher frequency than the events taking place in the application. Removing the clock from slow application events, as described herein, may greatly reduce the power consumption of the circuit.

It is noteworthy that non-clocked intelligent logic has been difficult to design correctly for MCU applications in the past, as there are few skilled engineers designing in this domain. A primary reason for this is that non-clocked intelligent logic is much larger than the size of equivalent clocked logic. However, logic is now less expensive and this size increase may be less of an issue in certain applications. Furthermore, and in particular recently, design tools have appeared that allow synchronous designs to be translated into asynchronous (non-clocked) designs. Also, by carefully selecting specific logic modules to implement with asynchronous (non-clocked) circuit designs, it is possible to perform key MCU functions with limited interface with other clocked (synchronous) logic modules.

In accordance with embodiments of the invention, a microcontroller unit comprises synchronous logic operably coupled to non-clocked intelligent logic. The non-clocked intelligent logic is arranged to monitor whether one or more operational parameter(s) of the synchronous logic is outside of an operational range and, in response thereto, the non-clocked intelligent logic initiates a safety operational mode for performing operational functions of the microcontroller unit. Various embodiments of the safety operational mode are described below.

Figure 3:
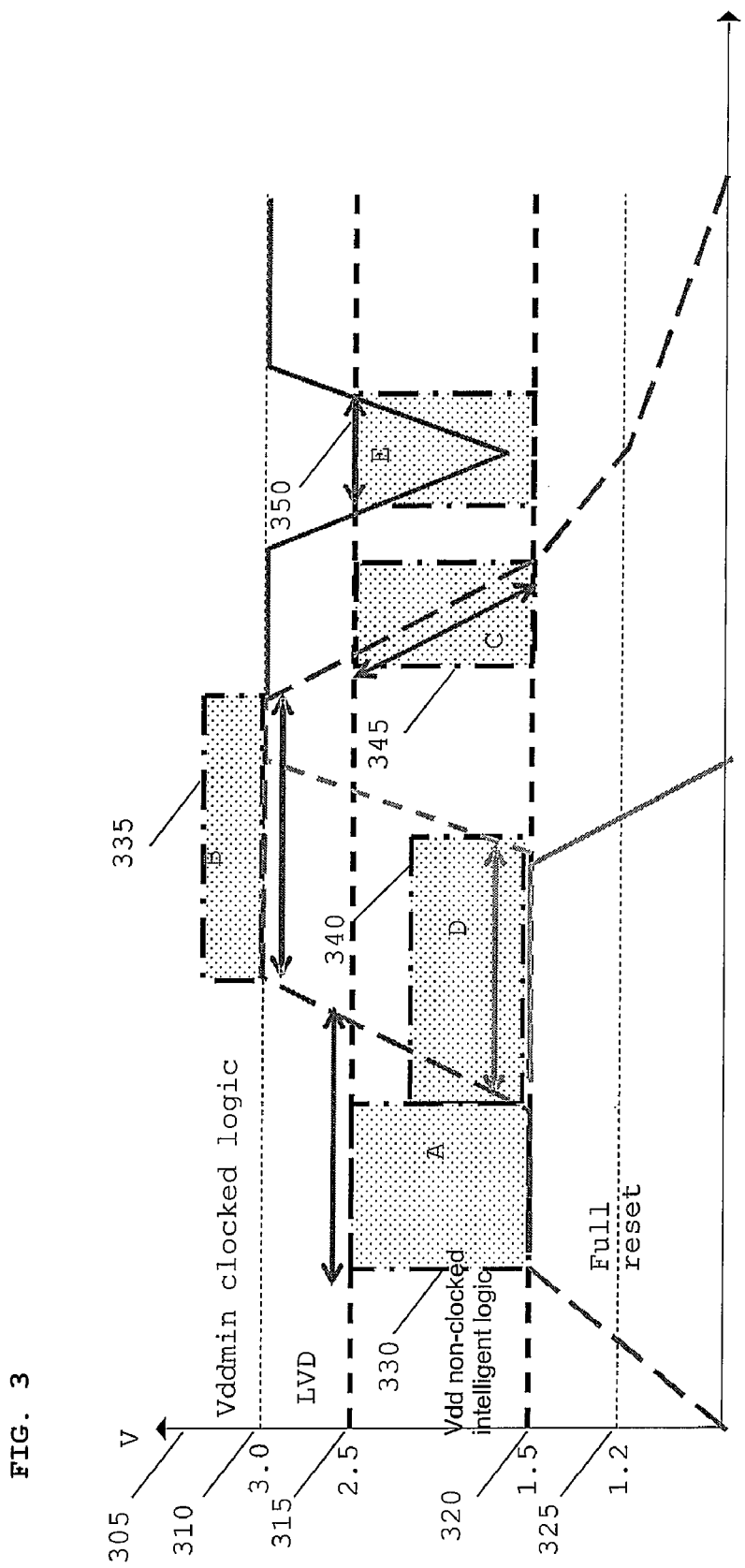
FIG. 3 illustrates an operation cycle of an MCU in accordance with embodiments of the invention.

For example, let us consider an operation cycle of an MCU (say MCU 100 of FIG. 1), as illustrated in FIG. 3. The operation cycle is illustrated graphically, with Vdd 305 shown against time. Upon switch-on of the MCU, the voltage supplied to the MCU increases, past a full reset threshold level of 1.2V 325, to a voltage level of 1.5V 320. In this 'A' region 330, the non-clocked intelligent logic modules validate the CPU wake-up signal and are arranged to take control of the MCU operation in this region 330. Thereafter, the voltage supplied to the MCU increases to the 'B' region 335, beyond a Vdd or 3.0V 310, when the normal operating conditions are established for the circuit. It is envisaged that the clocked synchronisation logic is arranged to take control in this 'B' region 335. Thus, only clocked synchronous logic only guarantees a specific operational performance to the CPU in condition 'B'.

Thus, in one embodiment of the invention, there is a handover between non-clocked intelligent logic and synchronous sets of logic, at various times, depending upon the operating conditions seen by the circuit as a whole.

Thereafter, in some instances, the Vdd of the MCU circuit will drop below the Vdd min of the clocked (synchronous) logic threshold level of 3.0V 310, and thereby enter region 'C' 340 or region 'E' 350. In the 'C' region 345, the non-clocked intelligent logic manages powering-down when the CPU is no longer functional. In region 'C' 340, the MCU circuit is able to configure ports to a safe state during power down. Furthermore, the MCU circuit is able to hold unused modules in reset as well as stop CPU clocks below LVD voltage.

In the 'E' region 350, following a Brown-out condition, the non-clocked intelligent logic is fully operational and is able to ensure correct restart of the CPU. As shown in FIG. 3, an alternative region 'D' 340 is also possible, whereby the non-clocked intelligent logic is operating autonomously and is able to select not to start the CPU. In this situation the non-clocked intelligent logic determines if the MCU should remain in the lower voltage mode, and then shut down power completely, or later enable the voltage regulator to increase the voltage to the rest of the MCU and release control to the synchronous logic.

Thus, non-clocked intelligent logic may be fully functional in all regions 'A' 330, 'B' 335, 'C' 340, 'D' 345, 'E' 350. This may provide a more secure control of powering-up and powering-down of the MCU. A secondary advantage may also be provided in that lower power consumption may be achieved whilst the MCU is operating in a low voltage operation using the non-clocked intelligent logic.

In region 'C' 340 the power down of the MCU may lead to unpredictable operation. An example of such an unpredictable operation is in reading some portions of the MCU logic incorrectly and consequently causing incorrect operation, such as writing contents of memory with erroneous data. In this case the function of the non-clocked intelligent logic is to provide safe removal of the voltage supply to the synchronous logic and prevent incorrect or unpredictable operation, whilst still providing some simple functionality during this power down phase. It is envisaged that such simple functionality may be to complete writing to non volatile memory, which may have started prior to the power down event and which is not yet completed. Ensuring the power down is completed safely improves data integrity and may also be used to ensure stable I/O signals during this voltage transition.

In region 'E' 350 the device may experience a temporary event resulting in loss of voltage supply to the MCU. A brief event may allow the voltage supply to decay below the operation voltage for the synchronous logic, but still allow the non-clocked intelligent logic to fully operate. In these circumstances a recovery to normal operation is possible. However, there may be some unpredictable results whereby the synchronous logic may have been affected by this brief voltage reduction. An example may be data corruption through fast clocks not allowing correct logical operation at the reduced voltage. In accordance with embodiments of the invention, non-clocked intelligent logic may be arranged to effectively monitor such events, take control of the synchronous logic to prevent errors developing and signal that an event occurred when the voltage recovers, Incorrect programming the flash memory in production line environments is a common problem where 'brown-out' problems occur and where there is insufficient protection to prevent partial/incomplete programming or when the brown-out event is not noticed by the MCU and causes later reliability failures through poor data programming.

Figure 4:
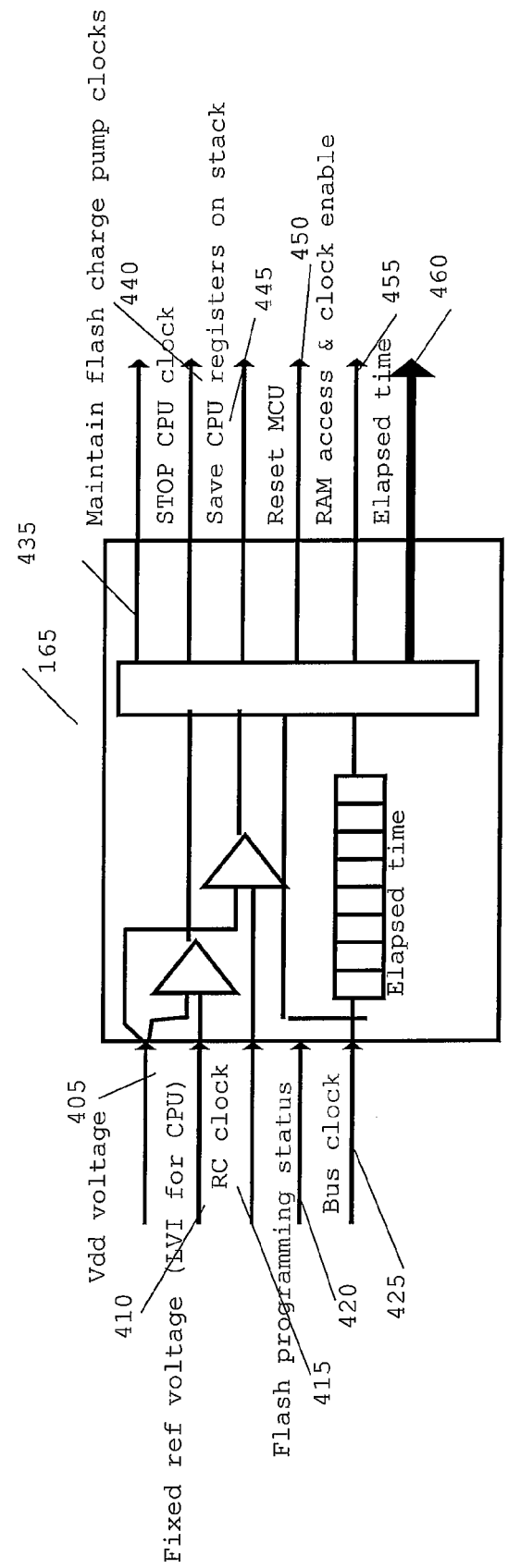
FIG. 4 illustrates an asynchronous brown-out detection and management logic module/circuit in accordance with a first, second and third embodiment of the invention.

Referring now to FIG. 4, one embodiment of the invention is described with respect to an operation of a non-clocked intelligent brown-out detection and management logic module/circuit 165. In this embodiment of the invention, the MCU circuit utilises full functionality over a wide range of Vdd supply voltages for the non-clocked intelligent brown-out detection and management logic module/circuit 165 to control powering-up and powering-down of the MCU, for example in a temporary loss of power (otherwise referred to as a Brown-out) condition. The non-clocked intelligent brown-out detection and management logic module/circuit 165 comprises, for example, input ports for receiving a Vdd voltage 405, a fixed reference voltage (such as a low voltage interrupt (LVI) for the CPU) 410, a flash programming status signal 420, an R-C-clock 415 and a bus clock 425. The non-clocked intelligent brown-out detection and management logic module/circuit 165 may further comprise, for example, output ports for supporting signal transfer, such as a maintain flash charge pump clock 435, a stop CPU clock signal 440, a save CPU registers on the stack signal 445, a reset MCU signal 450, a random access memory (RAM) and clock enable signal 455 and an elapsed time signal 460.

The non-clocked intelligent brown-out detection and management logic module/circuit 165 may provide, inter alia, a monitoring operation of the Vdd supply voltage to the controller. Thus, it is able to provide control signals to ensure a fully safe operation of the MCU by taking control when the supply voltage exceeds the allowed value for correct operation of the clocked synchronous logic.

In one embodiment of the invention, it is envisaged that the non-clocked intelligent brown-out detection and management logic module/circuit 165 may be configured to detect a low voltage level, and, in response thereto, perform one of the following:

At the detected low voltage threshold level in FIG. 3, i.e. region 'E' 350, the non-clocked intelligent brown-out detection and management logic module/circuit 165 may be arranged to force the CPU to push registers onto the memory stack.

Stop the CPU clock(s) and/or stop one or more clocks in RAM to preserve any data.

Prevent RAM access after a CPU register save.

As the non-clocked intelligent logic circuit (state machine) starts to function, as the power supplied to the MCU increases, it may be configured to perform one or more of the following:

It may be arranged to continue to monitor a lower Vdd level, rather than maintain a RAM voltage. In response thereto, the non-clocked intelligent logic circuit may set a flag to indicate a particular operating condition and drive signals to ensure safe return to normal operation via a normal full Power-on reset.

It may be arranged to signal a full return of Vdd to normal operating conditions, to facilitate a fast CPU re-start from RAM.

It may be arranged to control the MCU operation during a temporary loss of the Vdd supply voltage, through implementing a recovery operation, for example in the case of a brief interruption event.

Figure 5:
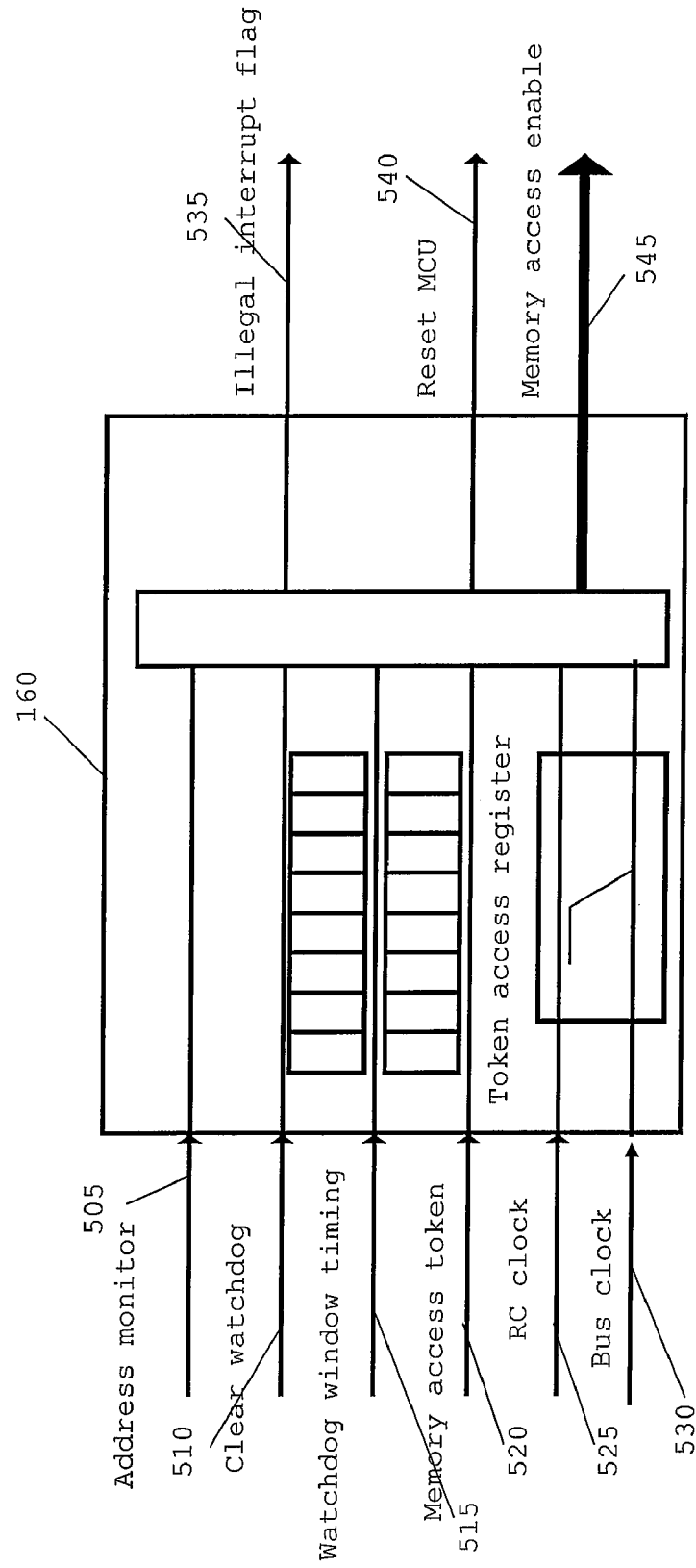
FIG. 5 illustrates an asynchronous safety condition logic module/circuit in accordance with a first and third embodiment of the invention.

Referring now to FIG. 5, one embodiment of the invention is described with respect to an operation of a non-clocked intelligent safety condition logic module/circuit 160. The non-clocked intelligent safety condition logic module/circuit 160 comprises, for example, input ports for receiving address monitor signals 505, a clear watchdog signal 510, a watchdog window timing signal 515, a memory access token signal 520, an R-C-clock 525 and a bus clock 530. The non-clocked intelligent safety condition logic module/circuit 160 further comprises, for example, output ports such as an illegal interrupt flag signal 535, a reset MCU signal 540 and a memory access enable signal 545.

The non-clocked intelligent safety condition monitor logic module 160 is arranged to operate in all valid functional conditions above approx. 1.2V. The non-clocked intelligent safety condition monitor logic module 160 is able to monitor the activity on the MCU, including the address bus, MCU COP (watchdog), bus clocks and other internal control signals that can indicate a correct or incorrect MCU operation.

As the non-clocked intelligent safety condition monitor logic module 160 operates fully over a wider range of environmental conditions than the clocked circuit of the MCU logic, it is able to detect failures and execute control actions and signals to ensure safe conditions for any application being run. With respect to the operational regions of FIG. 3, the non-clocked intelligent safety monitor logic may be operational in regions 'A' 330, B' 335, 340.

Such a monitor activity could be, for example, determining an illegal address monitor 505 with protection of the data in RAM to avoid critical data corruption or general purpose input/output (GPIO) access following an error condition.

It is also envisaged that simple control management functions can be created, such as token passing 515 for access to key sections of memory, which will not be corrupted by sudden changes in the physical environment around the MCU.

As previously indicated, it is envisaged that the non-clocked intelligent safety condition monitor logic module 160 is arranged to have control over the clocked logic due to its greater tolerance to external voltage or temperature changes.

In this manner, embodiments of the invention propose use of non-clocked intelligent logic within a MCU to extend the operating range of the device. Normal operation of a MCU may be from 1.8V to 3.6V. However, when employing non-clocked intelligent logic, this range extends use of the MCU to below 1.8V.

Similarly, it is known that semiconductor devices are affected by temperature. Typically the propagation delay increases as the temperature increases. This is driven by the physics of semiconductor transistors. This effect means that as the temperature increases, generally the maximum clock frequency supported by a specific design may reduce. Thus, a design may fail to operate correctly at a high temperature, but operate correctly at a lower temperature.

A feature of non-clocked intelligent logic, utilised in embodiments of the invention, is that it operates without requiring a clock to move the state of the logic from one state to another. Effectively the non-clocked intelligent logic states propagate depending upon the inputs that dictate the state of the logic and transition as fast as the logic allows at that time. At higher temperatures the non-clocked intelligent logic automatically slows its speed of state transition, accounting for the propagation delays in the semiconductor transistors.

Use of non-clocked intelligent logic to function without a specific clock frequency allows this non-clocked intelligent logic to ensure correct functionality across a wider range of temperatures than synchronous logic in typical devices. This advantage results from the clocking frequency being often specified by other system parameters and may be a higher frequency than possible for high temperatures, causing timing errors within the synchronous logic which in turn develop into data corruption or program flow errors.

In summary, embodiments of the invention provide for the complete control of a secondary circuit of the MCU, by the non-clocked intelligent logic at voltages or temperatures that are normally forbidden for use with the clocked logic of the MCU, which is usually tuned for higher performance functionality and has specific limitations for low voltages or high temperatures. In a number of embodiments, the secondary circuit would be a main CPU module within a MCU, which has been designed using synchronous logic techniques.

Figure 6:
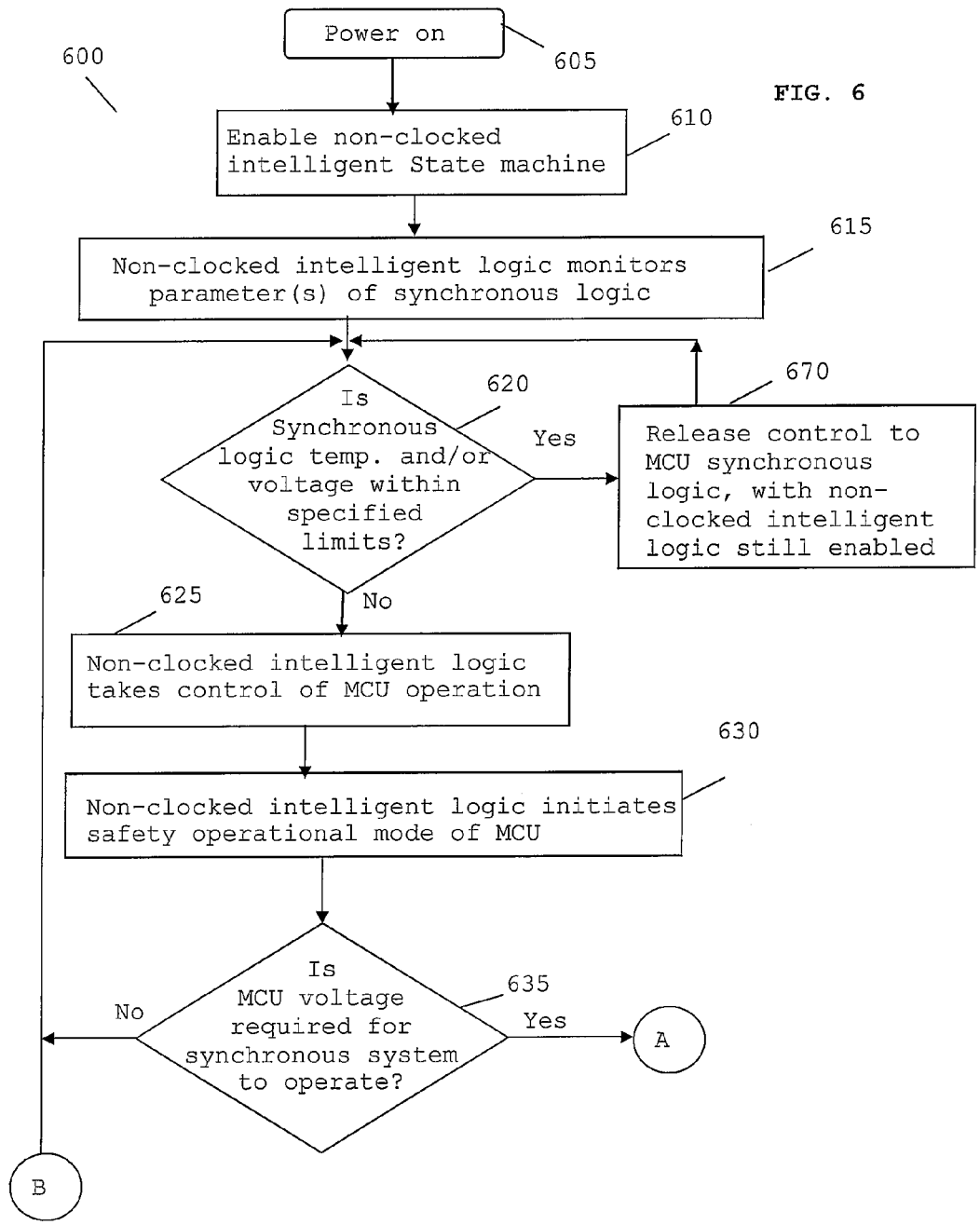
FIG. 6 and FIG. 6B illustrate flowcharts of a microcontroller unit in accordance with a first embodiment of the invention.
Figure 6B:
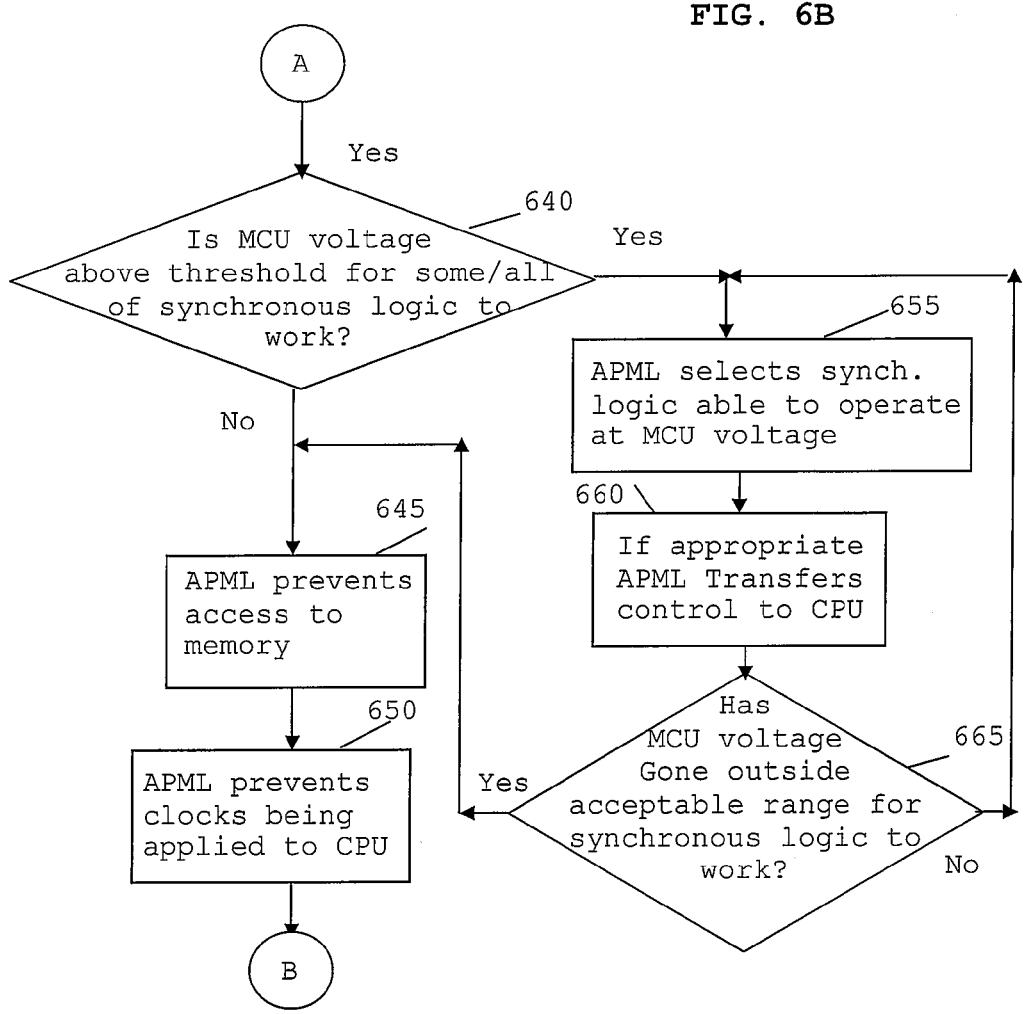

Referring now to FIGS. 6 and 6B, a flowchart 600 illustrates one method of operating an MCU in accordance with one embodiment of the invention. The flowchart commences with the MCU being powered in step 605 and one or more non-clocked intelligent logic modules (state machines) being enabled, as shown in step 610.

In one embodiment of the invention, non-clocked intelligent logic monitors one or more parameter(s) associated with the operation of synchronous logic, as in step 615. If the non-clocked intelligent logic determines that the one or more parameter(s), such as temperature and/or voltage, associated with the operation of synchronous logic operates within specified limits in step 620, the non-clocked intelligent logic relinquishes control of the MCU to the clocked (synchronous) logic, as shown in step 670.

In contrast, according to embodiments of the invention, if the non-clocked intelligent logic determines that the one or more parameter(s), such as temperature and/or voltage, associated with the operation of synchronous logic operates outside of specified limits in step 620, the non-clocked intelligent logic takes control of the MCU, as shown in step 625. In this regard, in one embodiment of the invention, the non-clocked intelligent logic initiates a safety operational mode, as shown in step 630. In this regard, the safety operational mode may encompass one or more of the following.

In one embodiment of the invention, the non-clocked intelligent power management logic monitors one or more voltage levels and compares the monitored one or more voltage levels against threshold values, for the MCU operation, for example identifying whether the voltage supplied to synchronous logic operates outside of specified limits. If the non-clocked intelligent power management logic identifies that the MCU voltage is not required for the synchronous logic/system to operate, in step 635, the process then loops back to step 610 to identify whether the non-clocked intelligent power management logic is the ideal vehicle to subsequently control the power-up/power-down process of the MCU.

However, if the non-clocked intelligent power management logic identifies that the MCU voltage is required for the synchronous logic/system to operate, in step 635, the non-clocked intelligent power management logic may determine whether the MCU voltage is above a threshold voltage for some or all of the synchronous logic to work, as shown in step 640.

In one embodiment of the invention, if the non-clocked intelligent power management logic determines that the MCU voltage is above a threshold voltage for some or all of the synchronous logic to work, in step 640, the non-clocked intelligent power management logic may select synchronous logic able to operate at the MCU voltage, as shown in step 655. Alternatively, separate selective logic may be used to perform this function. The non-clocked intelligent power management logic may then, if appropriate, transfer control of the MCU to the central processing unit, as in step 660. A determination may be made by the non-clocked intelligent power management logic as to whether the MCU voltage has moved outside an acceptable range for the synchronous logic to work, in step 665. If the MCU voltage has not moved outside an acceptable range for the synchronous logic to work, in step 665, the process loops back to step 655.

If the MCU voltage has moved outside an acceptable range for the synchronous logic to work, in step 665, or if the non-clocked intelligent power management logic determines that the MCU voltage is not above a threshold voltage for some or all of the synchronous logic to work in step 640, the non-clocked intelligent power management logic may prevent access to memory, as shown in step 645. In this regard, the non-clocked intelligent power management logic may also prevent any clock signals from being applied to the CPU, as shown in step 650. In one embodiment of the invention the process may then loop back to step 610.

Thus, the aforementioned use of one or more non-clocked intelligent logic modules facilitate MCU control, where the non-clocked intelligent logic circuit may perform, say one or more of the following tasks independently of a secondary (synchronous) clocked circuit:

Control of power up of the MCU.

Manage the power up of the MCU to ensure correct functionality only when the clocked logic is fully operational.

Validate the correct conditions for release of the clocked logic reset and pass control to the clocked logic once the conditions are correct.

Control of power down of the MCU

Manage the power down of the MCU to prevent code runaway due to partially functional clocked logic operation during decaying Vdd.

Take control of the Clocked logic and assert control signals, such as reset or clock inhibit, to ensure data and functional integrity is maintained while reducing Vdd.

Brown-out detection and recovery.

Vdd supervisor logic. If a brown-out is detected, the flash charge pump may be supplied with clocks from the non-clocked intelligent logic to maintain Vpp until programming completed. A flag should be set to identify the brown out condition should the Vdd not drop below RAM data retention voltage.

Capture Vdd drop event (using dedicated detection circuit), validate voltage ramp and extent of deviation, determine when to stop CPU clocks to prevent code run away and finally to set flags for access during recovery, should the Vdd supply not drop below a RAM data retention voltage.

Force a write of a flash bit to indicate a brown-out condition has occurred for subsequent power up recovery analysis It will be understood that the improved microcontroller unit, and method of operation therefor, as described above, aims to provide at least one or more of the following advantages:

Non-clocked intelligent low voltage detection, interrupt or reset circuits may be implemented to prevent uncontrolled operation outside the specification conditions of a product employing synchronous logic;

The capability to exert a greater degree of control on a synchronous logic design when working outside it's normal operating range is achieved using non-clocked intelligent logic;

Ability to reduce external low voltage protection requirements, thus reducing system cost for customers;

Safety feature as an MCU may be able to recover from out-of-specification conditions in a controlled manner resulting in more predictable operation, thereby making a product more suitable in Fail-safe applications;

Faster start-up of a synchronous device in an application by allowing the non-clocked intelligent logic to take control before correct operation of the synchronous logic can be guaranteed; and A MCU device and start-up may be performed quicker, recover faster from brown-out conditions and operate in a more deterministic manner.

In accordance with embodiments of the invention, a microcontroller unit comprises synchronous logic operably coupled to a supply voltage source. The microcontroller unit comprises non-clocked intelligent power management logic operably coupled to the supply voltage source and arranged to control a power-up and/or power-down operation of the microcontroller unit.

Figure 7:
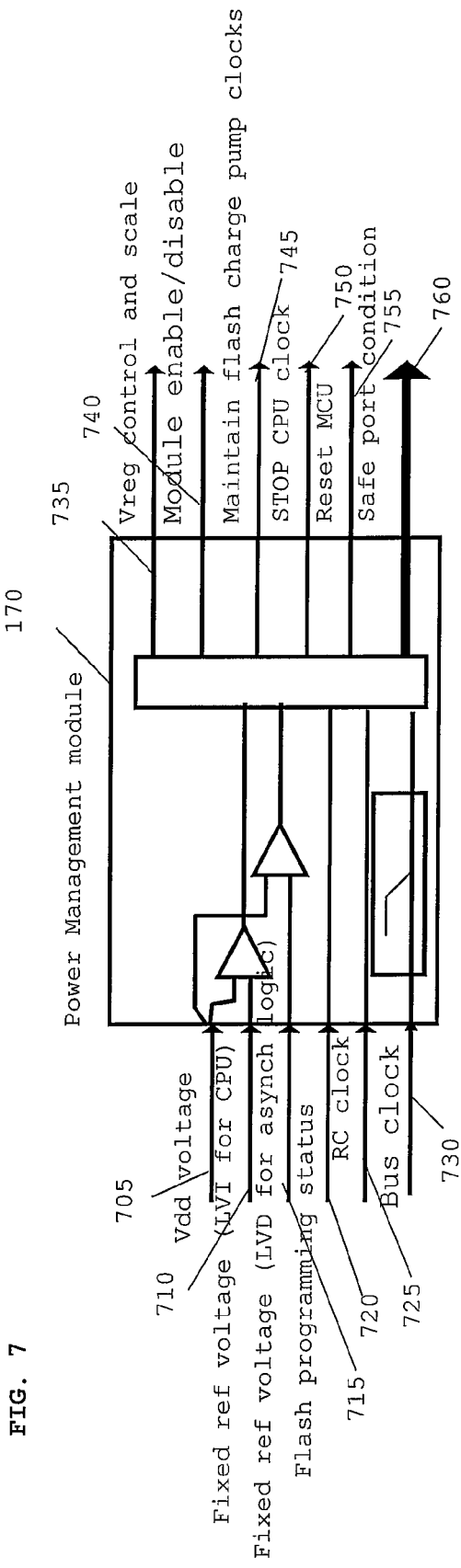
FIG. 7 illustrates asynchronous power management logic in accordance with the second embodiment of the invention.

Referring now to FIG. 7, one embodiment of the invention is described with respect to an operation of non-clocked intelligent power management logic 170. The non-clocked intelligent power management logic 170 comprises, for example, input ports for receiving a Vdd voltage 705, a fixed reference voltage (such as a low voltage interrupt (LVI) for the CPU) 710, a further fixed reference voltage (such as a low voltage device (LVD) for the non-clocked intelligent logic elements) 715, a flash programming status signal 720, an R-C-clock 725 and a bus clock 730. Often, known LVI operation is specified at less than full operation of the MCU, which leads to erroneous operation of the MCU at maximum bus frequencies as the Vdd drops to the LVI voltage level. The non-clocked intelligent power management logic 170 comprises, for example, output ports such as a regulated voltage control and scale signal 735, a module enable/disable signal 740, a maintain flash charge pump clock 745, a stop CPU clock signal 750, a reset MCU signal 755 and a safe port condition signal 760.

The non-clocked intelligent power management logic 170 provides, inter alia, supervisory control for the voltage regulator. In this manner, the module 170 is arranged to control the Voltage Regulator output by matching the output current against the load required, for a particular moment in time. Hence, as power is applied to the MCU, non-clocked intelligent power management logic 170 supports a minimum required output current from the voltage regulator. Furthermore, the non-clocked intelligent power management logic 170 may also be arranged to hold off the operation of all of the other non-clocked intelligent logic modules, if desired.

As the non-clocked intelligent logic circuit (state machine) starts to function, it determines which of the other MCU modules (of FIG. 1) is/are required for the application to function. The anticipated current consumption demand for all of the identified modules is then matched against the voltage regulator output. In this manner, the load conditions of the MCU may be optimised and, hence, power consumption may be minimised.

Since the non-clocked intelligent state machine is able to function rapidly, and regardless of the status of system clocks, optimum power consumption alongside ultra-fast execution may be achieved. The non-clocked intelligent state machine may also be capable of being extended to monitor various input/output (I/O) states, and hence make even more intelligent decisions concerning voltage regulator/logic module selection.

It is further envisaged that, in one embodiment of the invention, that all unused modules (potentially even including the main CPU) may be held in a reset state with no clocks applied, again further reducing the dynamic power consumption.

Figure 8A:
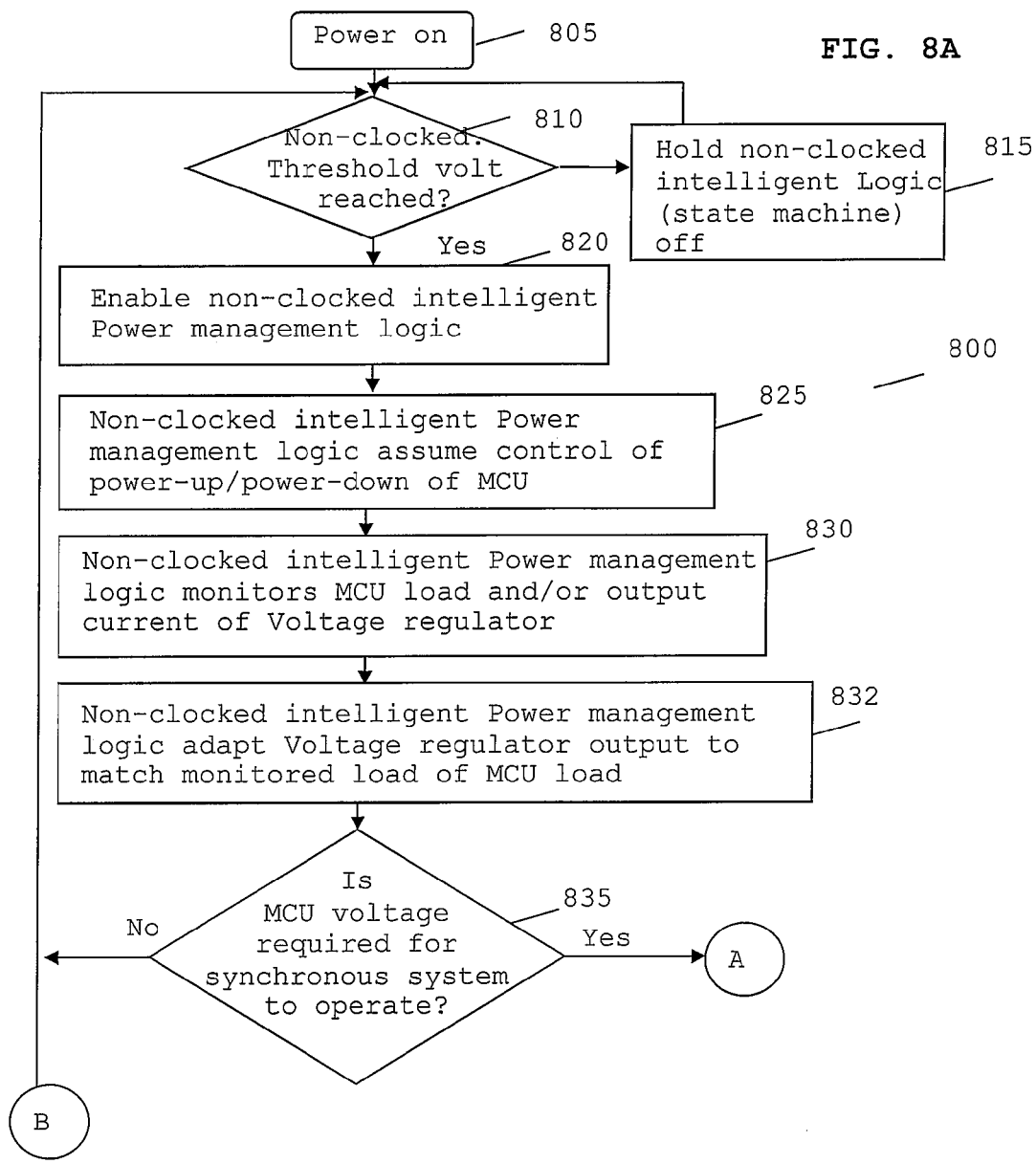
FIG. 8A and FIG. 8B illustrate flowcharts of a microcontroller unit in accordance with the second embodiment of the invention.
Figure 8B:
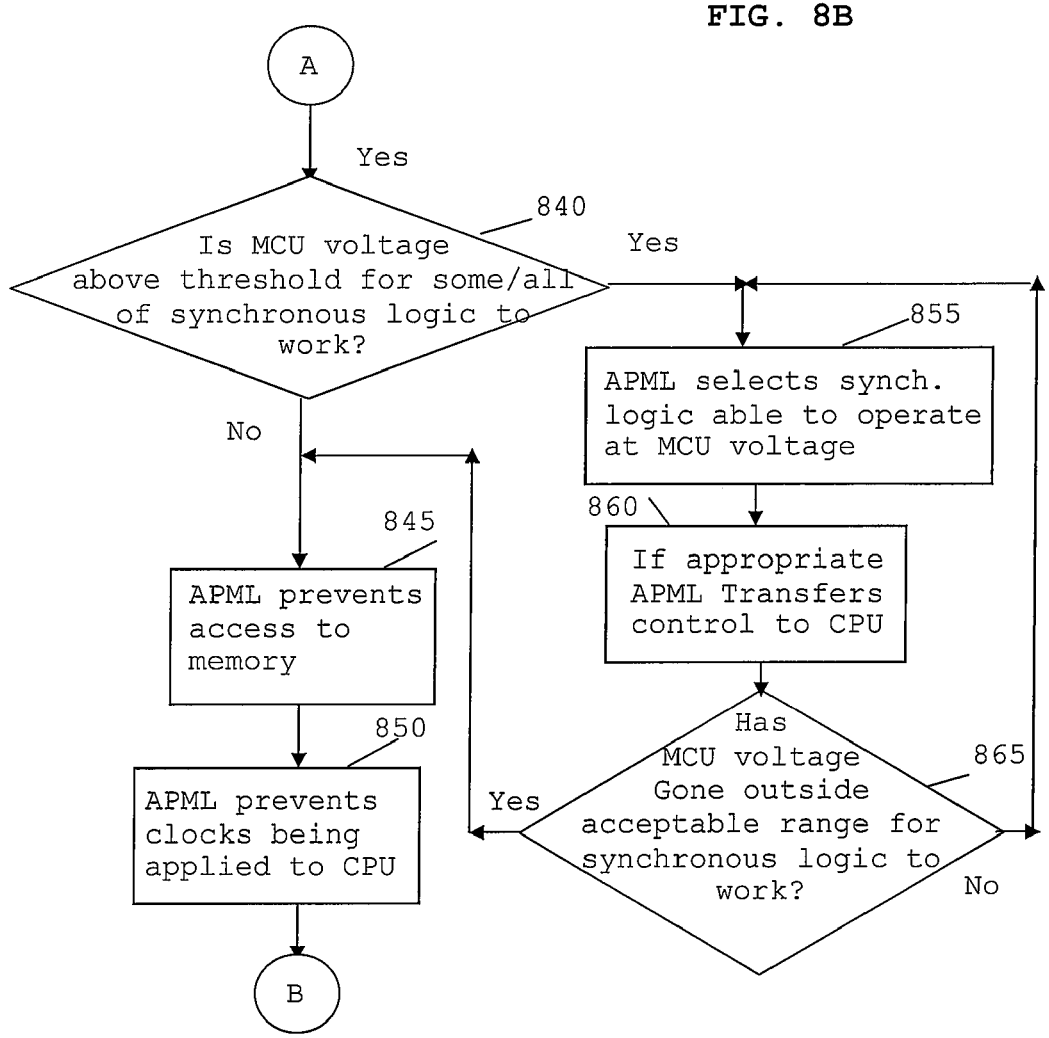

Referring now to FIG. 8, a flowchart 800 illustrates one method of operating an MCU in accordance with one embodiment of the invention. The flowchart commences with the MCU being powered in step 805 and a determination made as to whether a low voltage threshold of non-clocked intelligent power management logic has been reached, as shown in step 810. If the low voltage threshold of non-clocked intelligent power management logic has not been reached, in step 810, the non-clocked intelligent power management logic is maintained in an 'off' state, as shown in step 815. If the low voltage threshold of non-clocked intelligent power management logic has been reached, in step 810, the non-clocked intelligent power management logic is enabled, as shown in step 820.

In one embodiment of the invention, non-clocked intelligent power management logic thereafter assumes control of a power-up and/or power-down operation of the MCU, as shown in step 825. In one embodiment of the invention, the non-clocked intelligent power management logic monitors the MCU load and/or output current of a voltage regulator providing a source current to the MCU, as shown in step 830. In response to this monitoring operation, the non-clocked intelligent power management logic may adapt the voltage regulator operation to ensure the output current of the voltage regulator matches the MCU load, as shown in step 832.

In one embodiment of the invention, the non-clocked intelligent power management logic monitors one or more voltage levels and compares the monitored one or more voltage levels against threshold values, for the MCU operation, for example identifying whether the voltage supplied to synchronous logic operates outside of specified limits. If the non-clocked intelligent power management logic identifies that the MCU voltage is not required for the synchronous logic/system to operate, in step 835, the process then loops back to step 810 to identify whether the non-clocked intelligent power management logic is the ideal vehicle to subsequently control the power-up/power-down process of the MCU.

However, if the non-clocked intelligent power management logic identifies that the MCU voltage is required for the synchronous logic/system to operate, in step 835, the non-clocked intelligent power management logic may determine whether the MCU voltage is above a threshold voltage for some or all of the synchronous logic to work, as shown in step 840.

In one embodiment of the invention, if the non-clocked intelligent power management logic determines that the MCU voltage is above a threshold voltage for some or all of the synchronous logic to work, in step 840, the non-clocked intelligent power management logic may select synchronous logic able to operate at the MCU voltage, as shown in step 855. Alternatively, separate selective logic may be used to perform this function. The non-clocked intelligent power management logic may then, if appropriate, transfer control of the MCU to the central processing unit, as in step 860. A determination may be made by the non-clocked intelligent power management logic as to whether the MCU voltage has moved outside an acceptable range for the synchronous logic to work, in step 865. If the MCU voltage has not moved outside an acceptable range for the synchronous logic to work, in step 865, the process loops back to step 855.

If the MCU voltage has moved outside an acceptable range for the synchronous logic to work, in step 865, or if the non-clocked intelligent power management logic determines that the MCU voltage is not above a threshold voltage for some or all of the synchronous logic to work in step 840, the non-clocked intelligent power management logic may prevent access to memory, as shown in step 845. In this regard, the non-clocked intelligent power management logic may also prevent any clock signals from being applied to the CPU, as shown in step 850. In one embodiment of the invention the process may then loop back to step 810.

Thus, the aforementioned use of one or more non-clocked intelligent logic modules facilitate MCU control, where the non-clocked intelligent logic circuit may perform, say one or more of the following tasks independently of a secondary (synchronous) clocked circuit:

Manage the power up of the MCU to ensure correct functionality only when the clocked logic is fully operational.

Validate the correct conditions for release of the clocked logic reset and pass control to the clocked logic once the conditions are correct.

Manage the power down of the MCU to prevent code runaway due to partially functional clocked logic operation during decaying Vdd.

Take control of the Clocked logic and assert control signals, such as reset or clock inhibit, to ensure data and functional integrity is maintained while reducing Vdd.

In accordance with embodiments of the invention, a microcontroller unit comprises synchronous logic operably coupled to non-clocked intelligent logic. The non-clocked intelligent logic is arranged to autonomously control operations of the synchronous logic. In this regard, in accordance with embodiments of the invention, the non-clocked intelligent logic may be arranged to monitor the input/output (I/O) circuitry of the MCU to determine any events that require a response. Furthermore, the non-clocked intelligent logic may be arranged to monitor and control operation of the power management circuit to the MCU. In some embodiments of the invention, the non-clocked intelligent logic may be arranged to monitor and control release of reset to the MCU.

It is also envisaged that the non-clocked intelligent logic may be arranged to control, for example halt or enable, synchronous logic with respect to the clock signal delivery to the MCU. In addition, with respect to control of clock signals, it is envisaged that the non-clocked intelligent logic may be arranged to perform a monitor watchdog operation (typically provided by synchronous logic), and in some embodiments, provide a back-up watchdog functionality to detect or prevent code run-away.

It is also within the contemplation of the invention that the non-clocked intelligent logic may be arranged to detect bus errors and/or track a bus frequency to prevent out of specification operation.

In some embodiments of the invention, the non-clocked intelligent logic may be arranged to control synchronous logic in the form of output drivers, for example during a power-down operation. In some embodiments of the invention, the non-clocked intelligent logic may be arranged to detect an extent and/or duration of a brown-out event of synchronous logic, and therefore determine when it is safe to restart the MCU without a full reset.

In summary, embodiments of the invention provide for the complete control of a secondary circuit of the MCU, by the non-clocked intelligent logic at voltages or temperatures that are normally forbidden for use with the clocked logic of the MCU, which is usually tuned for higher performance functionality and has specific limitations for low voltages or high temperatures. In a number of embodiments, the secondary circuit would be a main CPU module within a MCU, which has been designed using synchronous logic techniques.

Figure 9:
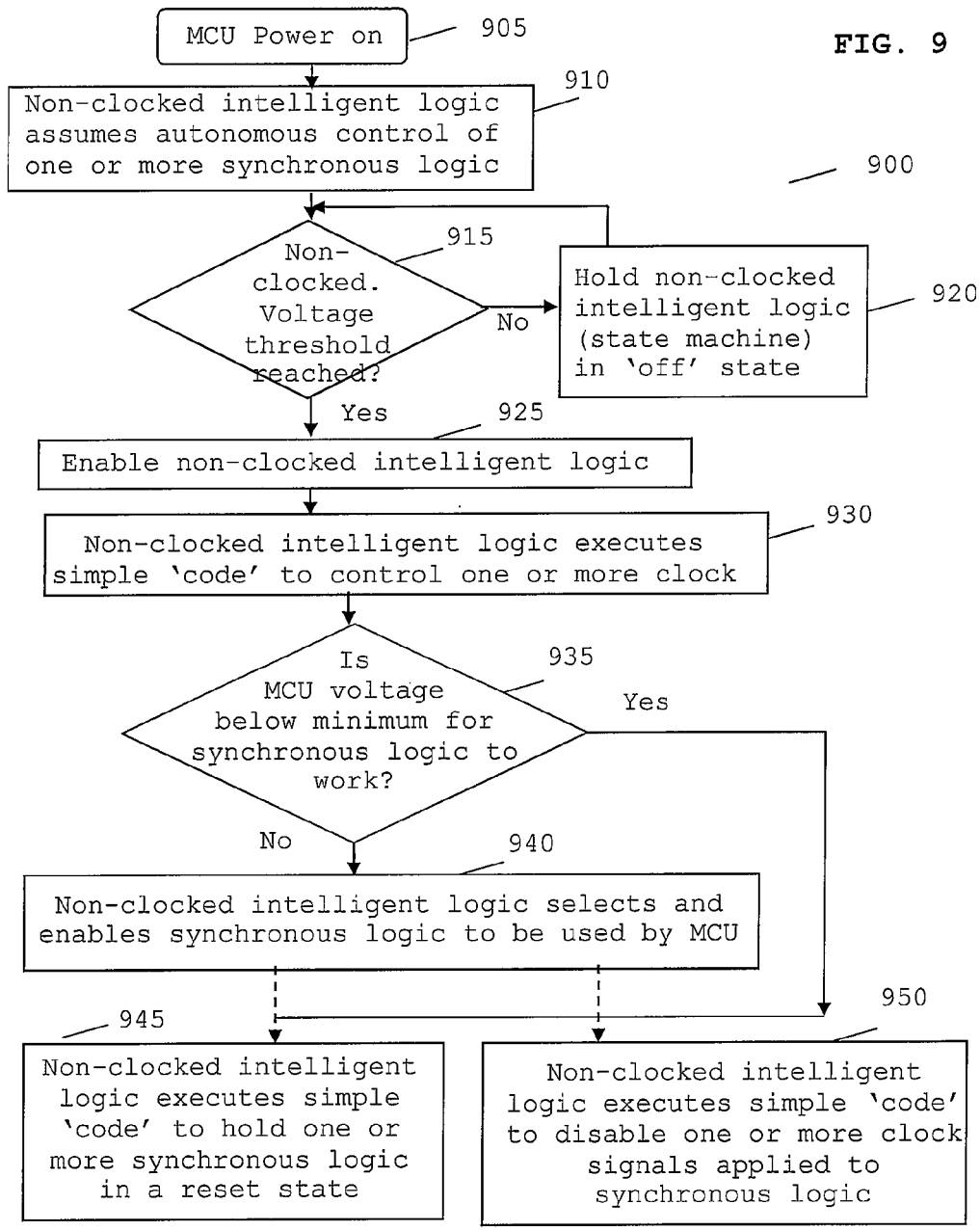
FIG. 9 illustrates a flowchart of a microcontroller unit in accordance with a third embodiment of the invention.

Referring now to FIG. 9, a flowchart 900 illustrates a method of operation of the one or more non-clocked intelligent logic module(s). The method of operation commences in step 905 with the MCU being powered on. Non-clocked intelligent logic is configured to assume control of one or more synchronous logic modules, in step 910. If a non-clocked intelligent logic voltage threshold has not been reached in step 910, i.e. a threshold voltage that is sufficient to allow the non-clocked intelligent logic to function, the operation of the non-clocked intelligent logic is maintained in an inactive state, as shown in step 920.

If the non-clocked intelligent logic voltage threshold has been reached, in step 910, the non-clocked intelligent logic (state machines) is enabled in step 925. The non-clocked intelligent logic then executes relatively simple code, for example to control one or more clock signals employed within the MCU, in step 930. The relatively simple code may perform, for example, checks or driving states of input/output (I/O) lines, RTC, initialising the display operation, etc. of the MCU.

A determination is made as to whether a voltage applied to the MCU is sufficient for one or more synchronous logic modules to function, in step 935. If the voltage applied to the MCU is sufficient for one or more synchronous logic modules to function, in step 935, the non-clocked intelligent logic selects synchronous logic module(s) to enable, as shown in step 940. The decision may be based on simple state machine, current state of I/O, time based decisions, etc.

If one or more synchronous logic modules are not to be enabled, in step 935, or one or more synchronous logic modules previously enabled are to be disabled, the non-clocked intelligent logic may execute simple code to hold the one or more synchronous logic modules in a reset state, in step 945, or disable the one or more synchronous logic modules by disabling a clock signal applied to the synchronous logic modules, in step 950.

Figure 10:
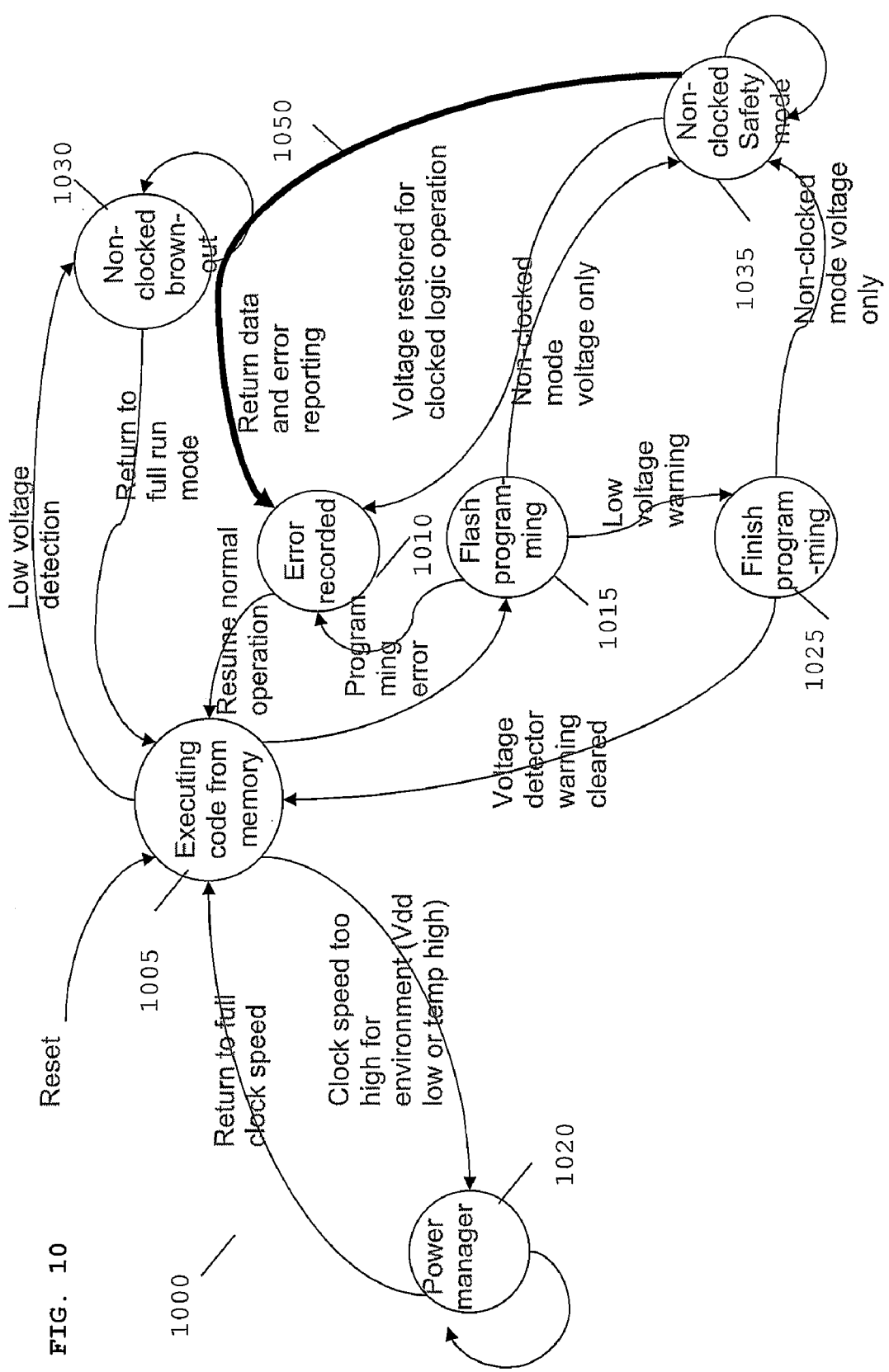
FIG. 10 illustrates a state machine diagram of a microcontroller unit in accordance with the first, second and third embodiments of the invention, with clocked and non-clocked states.

Referring now to FIG. 10, a state machine diagram 1000 of a microcontroller unit is illustrated in accordance with the first, second and third embodiments of the invention, having clocked and non-clocked states. The state machine diagram 1000 employed in the embodiments herein described, and running multiple applications over the total system may be broken into two parts:

The clocked logic, using, for example, normal digital logic design methodologies.

Non-clocked logic, using, for example, design tools to rebuild the logic from conventional VHDL or Verilog code.

This approach creates a non-clocked combinational logic block that is fully integrated with the clocked logic. Advantageously, both areas of logic can independently execute and can make their own decisions.

Thus, the state machine diagram 1000 comprises a number of logic elements or logic states using clocked logic, such as execution logic/state 1005 for executing code from memory, error recorded logic/state 1010 and flash programming logic/state 1015. Thus, typical clocked operations encompass, for example, flash programming logic/state 1015 identifying a programming error in programming a microcontroller unit's memory, and informing error recorded logic/state 1010. Once, the programming error has been recorded by error recorded logic/state 1010, the operation returns to normal, for example execution logic/state 1005 for executing code from memory.

In accordance with embodiments of the invention, the state machine diagram 1000 also comprises a number of logic elements or logic states using non-clocked intelligent logic, such as non-clocked intelligent brown-out logic/state 1030, non-clocked power management logic/state 1020, non-clocked finish programming logic/state 1025 and non-clocked intelligent safety logic/state 1035. In accordance with embodiments of the invention, as shown, the microcontroller unit comprises multiple input signals and multiple states controlled by non-clocked intelligent logic. Thus, multiple interactions between logic states can occur, for example in some embodiments, substantially simultaneously.

For example, the non-clocked power management logic/state 1020 identifies when the clock speed may be too high for the operating environment, due to, say, a low Vdd or high operating temperature. In such a case, the non-clocked power management logic/state 1020 may assume control from the clocked synchronous logic elements until the clock speed returns to within a desired operating range, at which time the non-clocked power management logic/state 1020 returns the control to the synchronous logic.

A further example is envisaged for when the non-clocked intelligent brown-out logic/state 1030 identifies when the microcontroller unit, or the synchronous logic, may be operating with, say, a low Vdd. In such a case, the non-clocked power management logic/state 1020 may assume control from the clocked synchronous logic elements until the Vdd returns to within a desired operating range, at which time the non-clocked power management logic/state 1020 returns the control to the synchronous logic.

Similarly, non-clocked finish programming logic/state 1025 may determine that the synchronous flash programming operation 1015 may be operating with, say, a low Vdd. In such a case, the non-clocked finish programming logic/state 1025 may assume control from the clocked synchronous logic elements until the Vdd returns to within a desired operating range, and/or issue a low voltage detected warning to the to the synchronous logic.

A yet further example is envisaged for when the non-clocked intelligent safety logic/state 1035 is informed, following a synchronous flash programming state 1015 or a non-clocked finish programming state 1025 that the microcontroller unit, or the synchronous logic, may be operating with, say, a low Vdd. In such a case, the non-clocked intelligent safety logic/state 1035 may assume control from the clocked synchronous logic elements and return data and error reporting 1050 to the synchronous error recorded logic/state 1010, or wait until the Vdd returns to within a desired operating range, at which time the non-clocked intelligent safety logic/state 1035 returns the control to the synchronous logic.

Thus, a skilled artisan will appreciate that the inventive concept herein described introduces the concept of autonomous behaviour of non-clocked logic within a single Microcontroller unit comprising both synchronous logic and non-clocked intelligent logic. A key distinguishing feature of the non-clocked logic of the inventive concept is the integrated, complex interaction with synchronous logic, with configurable support of the application outside synchronous logic operational limits.

Figure 11:
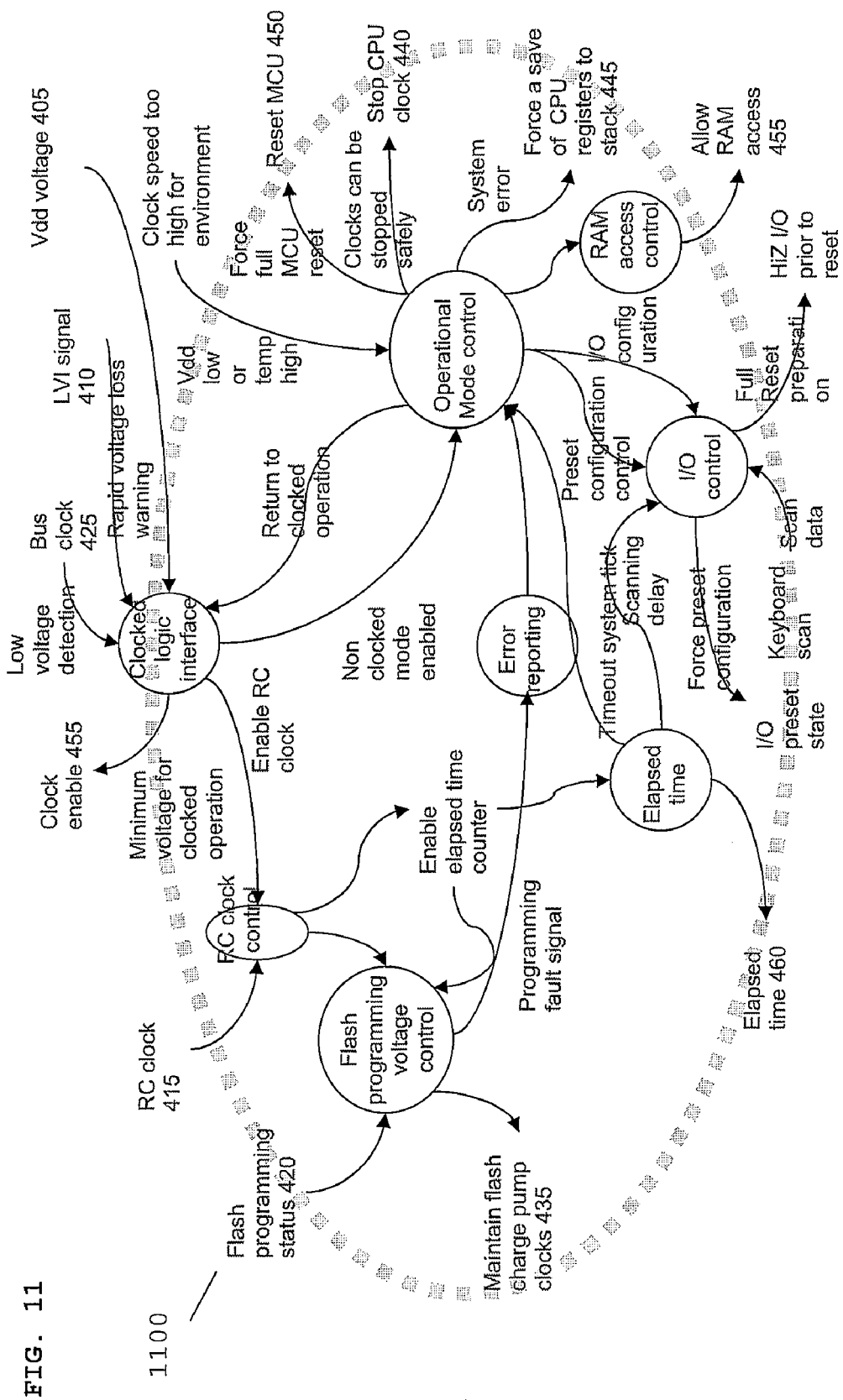
FIG. 11 illustrates a state machine diagram of a microcontroller unit including non-clocked intelligent brown-out logic in accordance with the first embodiment of the invention.

FIG. 11 illustrates a state machine diagram 1100 of a microcontroller unit including non-clocked intelligent brown-out logic in accordance with the first embodiment of the invention. The state machine diagram 1100 illustrates a more detailed view of the operations of FIG. 4. In this embodiment of the invention, the MCU circuit utilises full functionality over a wide range of Vdd supply voltages for the non-clocked intelligent brown-out detection and management logic module/circuit 165 to control powering-up and powering-down of the MCU, for example in a temporary loss of power (otherwise referred to as a Brown-out) condition. The non-clocked intelligent brown-out detection and management logic comprises, for example, input ports/signals for receiving a Vdd voltage 405, a fixed reference voltage (such as a low voltage interrupt (LVI) for the CPU) 410, a flash programming status signal 420, an R-C-clock 415 and a bus clock 425. It is envisaged that the above input ports/signals are not a complete list of all possible input ports/signals, as in other embodiments it is envisaged that the non-clocked intelligent brown-out detection and management logic may comprise one or more of the following: an identification as to whether the clock speed is too high for the operating environment, as illustrated with respect to FIG. 10, a keyboard scan input, a high input/output impedance prior to reset signal, etc.

The non-clocked intelligent brown-out detection and management logic may further comprise, for example, a number of output ports for supporting signal transfer, such as a maintain flash charge pump clock 435, a stop CPU clock signal 440, a save CPU registers on the stack signal 445, a reset MCU signal 450, a random access memory (RAM) and clock enable signal 455 and an elapsed time signal 460. As illustrated, it is envisaged that the non-clocked intelligent brown-out detection and management logic comprises multiple inputs, multiple outputs and multiple logic elements functioning in multiple states. Thus, it is envisaged that the illustrated examples are not exhaustive, and serve to illustrate the complexity of synchronous-non-clocked intelligent logic interaction that is supported by the inventive concept.

Figure 12:
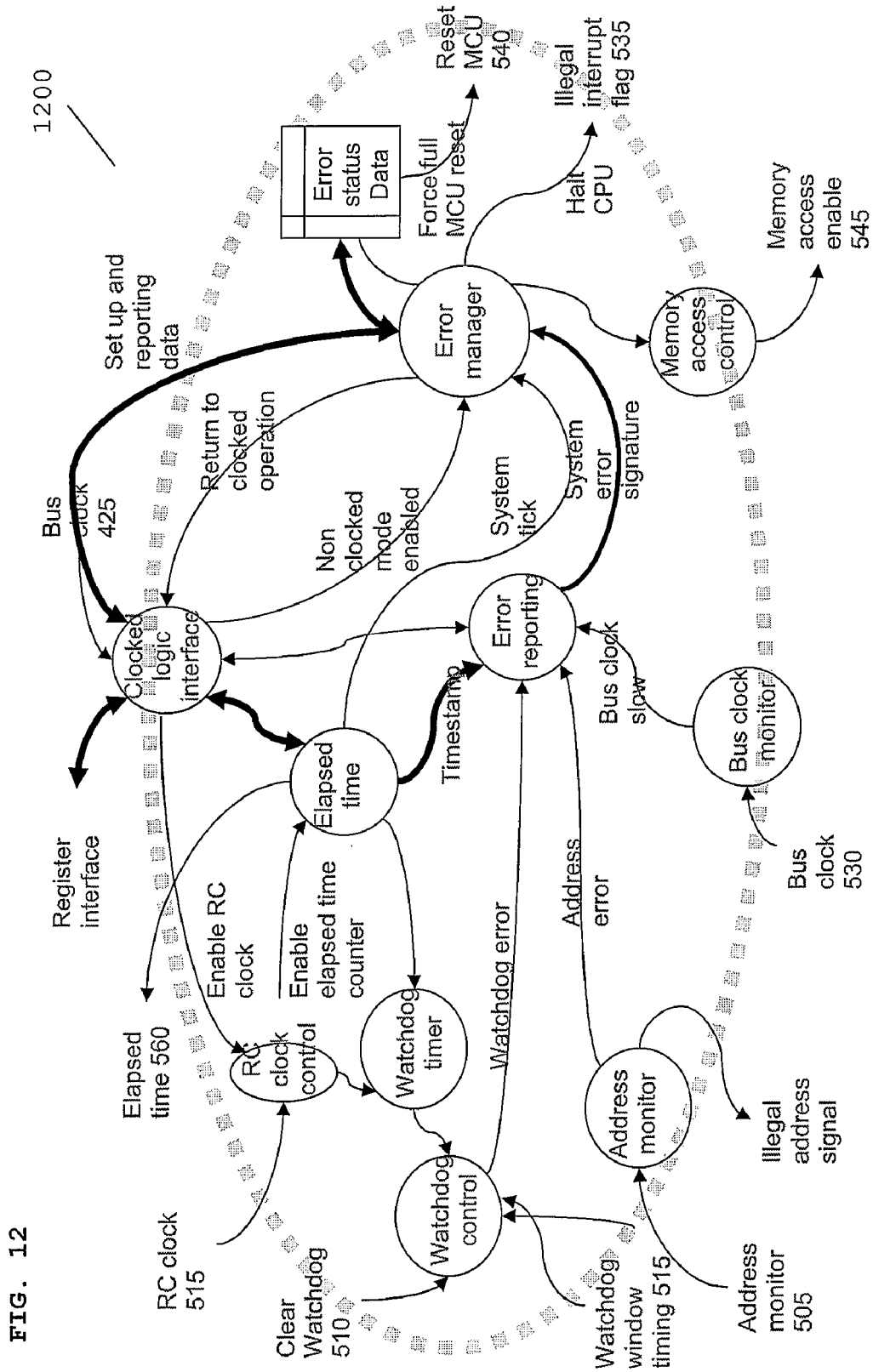
FIG. 12 illustrates a state machine diagram of a microcontroller unit including non-clocked intelligent power management logic in accordance with the second embodiment of the invention.

FIG. 12 illustrates a state machine diagram 1200 of a microcontroller unit including non-clocked intelligent power management logic in accordance with the second embodiment of the invention. The state machine diagram 1200 illustrates a more detailed view of the operations of FIG. 5. In this embodiment of the invention, the non-clocked intelligent safety condition logic comprises, for example, input ports for receiving address monitor signals 505, a clear watchdog signal 510, a watchdog window timing signal 515, a memory access token signal 520, an R-C-clock 525 and a bus clock 530. The non-clocked intelligent safety condition logic module/circuit 160 further comprises, for example, output ports such as an illegal interrupt flag signal 535, a reset MCU signal 540 and a memory access enable signal 545.

The use of local data storage within the non-clocked logic module allows for local conditions within the module to be stored for use either by the non clocked logic whilst the module is holding the synchronous logic in the halted state or by the synchronous logic when normal operation resumes or by both module when both are active at the same time. Thus configuration and data exchange can be communicated between the two modules for autonomous use. A data bus is also shown and illustrates the high level of functionality of the non-clocked logic to move configuration and reporting data between functions within the module.

Again, as illustrated, it is envisaged that the non-clocked intelligent safety condition logic comprises multiple inputs, multiple outputs and multiple logic elements functioning in multiple states. Thus, it is envisaged that the illustrated examples are not exhaustive, and serve only to illustrate the complexity of synchronous-non-clocked intelligent logic interaction that is supported by the inventive concept.

Figure 13:
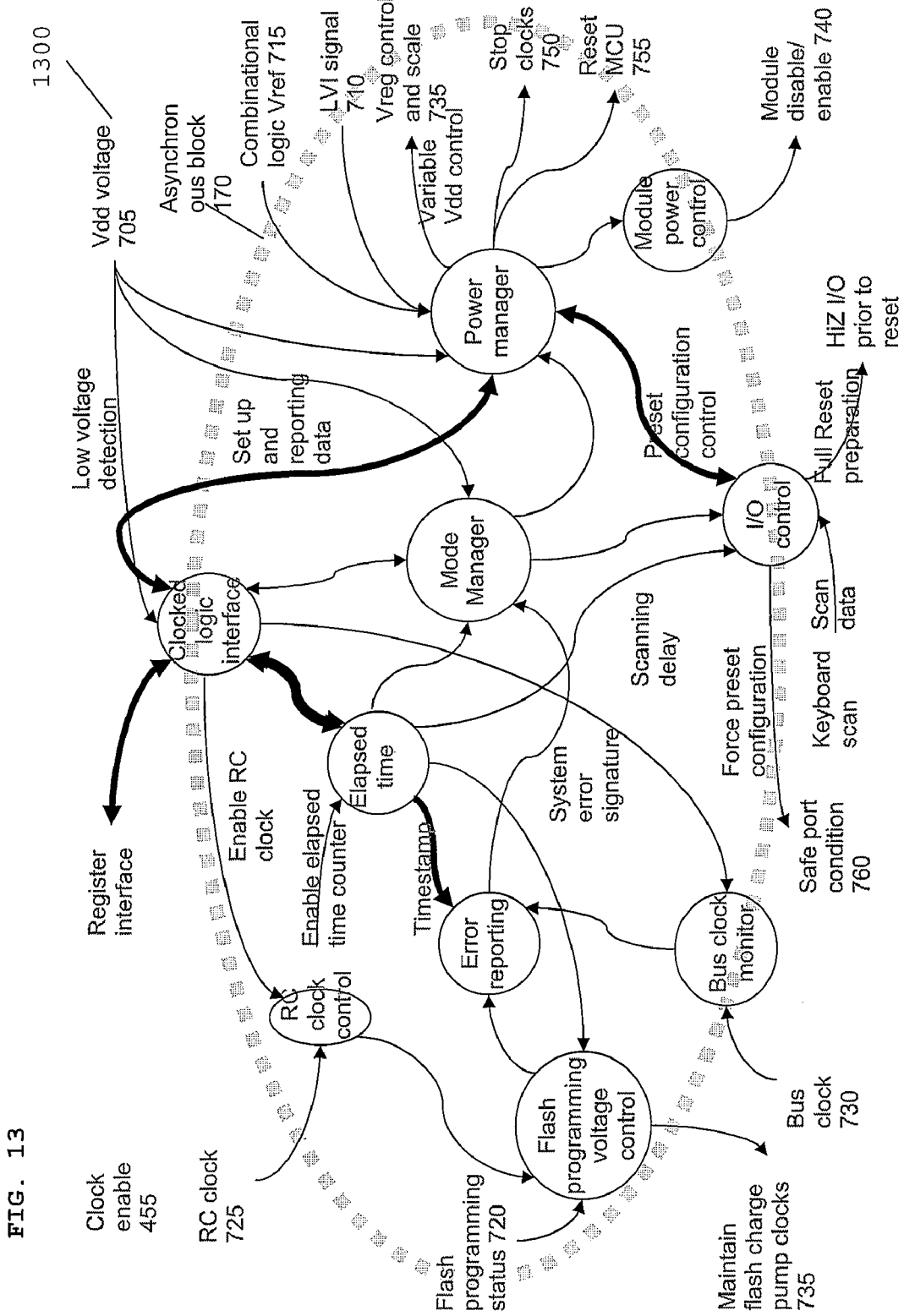
FIG. 13 illustrates a state machine diagram of a microcontroller unit including non-clocked intelligent safety logic in accordance with the third embodiment of the invention.

FIG. 13 illustrates a state machine diagram 1300 of a microcontroller unit including non-clocked intelligent power management logic in accordance with the third embodiment of the invention. The state machine diagram 1300 illustrates a more detailed view of the flowchart operations of FIGS. 6 and 6B.

In this embodiment of the invention, the non-clocked intelligent power management logic comprises, for example, input ports for receiving a Vdd voltage 705, a fixed reference voltage (such as a low voltage interrupt (LVI) for the CPU) 710, a further fixed reference voltage (such as a low voltage device (LVD) for the non-clocked intelligent logic elements) 715, a flash programming status signal 720, an R-C-clock 725 and a bus clock 730. Often, known LVI operation is specified at less than full operation of the MCU, which leads to erroneous operation of the MCU at maximum bus frequencies as the Vdd drops to the LVI voltage level. The non-clocked intelligent power management logic further comprises, for example, output ports such as a regulated voltage control and scale signal 735, a module enable/disable signal 740, a maintain flash charge pump clock 745, a stop CPU clock signal 750, a reset MCU signal 755 and a safe port condition signal 760.

The non-clocked intelligent power management logic provides, inter alia, supervisory control for the voltage regulator. In this manner, non-clocked intelligent power management logic is arranged to control the Voltage Regulator output by matching the output current against the load required, for a particular moment in time. Hence, as power is applied to the MCU, non-clocked intelligent power management logic supports a minimum required output current from the voltage regulator. Furthermore, the non-clocked intelligent power management logic may also be arranged to hold off the operation of all of the other non-clocked intelligent logic modules, if desired.

As the non-clocked intelligent logic circuit (state machine) starts to function, it determines which of the other MCU modules (of FIG. 1) is/are required for the application to function. The anticipated current consumption demand for all of the identified modules is then matched against the voltage regulator output. In this manner, the load conditions of the MCU may be optimised and, hence, power consumption may be minimised.

In contrast to the known art of U.S. Pat. No. 5,350,407 A, describing singular asynchronous event control, embodiments of the invention describe a much higher level of non-clocked intelligent logic, which is used to simultaneously monitor and control multiple events. Furthermore, these events can either be changed, either automatically or via program control, during operating conditions. In addition, embodiments of the invention differ from U.S. Pat. No. 5,350,407 A in that the wakeup logic is all non-clocked intelligent logic contained within the Microcontroller, and this portion of the microcontroller will operate immediately and make decisions concerning the rest of the microcontroller system. These decisions include the complete power up sequence and subsequent selective circuit switch-on and fully programmable/matched power regulation and control.

Furthermore, embodiments of the invention differ from U.S. Pat. No. 5,350,407 A in that a variety of levels are used to more intelligently determine appropriate courses of action. These include allowing operation of only the non-clocked circuits, operation of selected portions of the clocked circuits or operation of all of the circuits. Equally these levels are also used to determine regulator settings and performance. Again a degree of user configuration is also available to intelligently change the operating behaviour as per the application requirements.

Embodiments of the invention also differ from the known singular asynchronous event control art, as described in U.S. 5,350,407 A, in that a variety of levels are used to more intelligently determine appropriate courses of action. In the case of memory please see above description. In the case of the reset, our patent differs in that the reset will be an 'intelligent' reset. To clarify the level at which the reset operates and the circuitry on which it is applied is very much controlled by the non-clocked intelligent logic. Again a degree of user configuration is also available to intelligently change the reset behaviour as per the application requirements.

Notably, embodiments of the invention also rely on the inter-connectivity of multiple sets of clocked and non-clocked logic; the sharing of data cannot be through a standard synchronous bus interface. This is due to the clocked and non-clocked portions being inherently different in their operation.

Furthermore, embodiments of the invention also differ from U.S. Pat. No. 5,350,407 A in a case of power supply reduction, in that the power supply is intelligently scaled to match the required operating conditions. Hence, the non-clocked logic inherently allows operation well outside of typical clocked-system boundaries, thereby enabling a greater degree of flexibility and control.

Furthermore, embodiments of the invention also differ from U.S. Pat. No. 5,350,407 A in that the non clocked intelligent logic directly communicates with the synchronous portion. Hence, it is a single chip monolithic solution making complex decisions, autonomously within both synchronous and asynchronous domains.

In contrast to the known art of US 2003/110403 A1, embodiments of the invention integrate two design techniques, non-clocked logic and clocked logic, and then match the on-chip power supply against the immediate requirements. In today's microcontrollers the regulator normally has one or two modes of operation and is switched against various conditions. In accordance with embodiments of the invention herein described, the non-clocked logic operates first and then proceeds to make informed decisions concerning those portions (if any) of the clocked-logic that will be allowed to operate. Based on this processing intelligence, the regulator will then be adjusted before the clocked portion has been enabled. This advantageously leads to a very fast response matching of power consumption against needs, enabling ultra fast power cycling and efficient power usage.

In particular, it is envisaged that the aforementioned inventive concept can be applied by a semiconductor manufacturer to any microcontroller unit, for example those of the Freescale™ MCU family. It is further envisaged that, for example, a semiconductor manufacturer may employ the inventive concept in a design of a stand-alone device, or application-specific integrated circuit (ASIC) and/or any other sub-system element.

It will be appreciated that any suitable distribution of functionality between different functional units or MCU elements may be used without detracting from the inventive concept herein described. Hence, references to specific functional devices or elements are only to be seen as references to suitable means for providing the described functionality, rather than indicative of a strict logical or physical structure or organization.

Aspects of the invention may be implemented in any suitable form including hardware, software, firmware or any combination of these. The elements and components of an embodiment of the invention may be physically, functionally and logically implemented in any suitable way. Indeed, the functionality may be implemented in a single unit or IC, in a plurality of units or ICs or as part of other functional units.

Although the invention has been described in connection with some embodiments, it is not intended to be limited to the specific form set forth herein. Rather, the scope of the invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Thus, an improved microcontroller unit and method of operation therefor have been described, wherein the aforementioned disadvantages with prior art arrangements have been substantially alleviated.

The invention claimed is:

1. An integrated circuit comprising:
a microcontroller unit with synchronous logic operably coupled to non-clocked intelligent logic, wherein the non-clocked intelligent logic is arranged to autonomously monitor multiple events associated with an operation of the synchronous logic and, in response thereto, the non-clocked intelligent logic initiates autonomously an alternate operational mode of the microcontroller unit, wherein the non-clocked intelligent logic comprises selective logic operably coupled to the synchronous logic, wherein in response to the non-clocked intelligent logic monitoring an event, the selective logic selects and enables synchronous logic that is capable of operating at a low operational supply voltage for one or more microcontroller unit applications.

2. The integrated circuit of claim 1 wherein the alternate operational mode comprises at least one of the group consisting of:
a safety mode;
a low power mode;
a power initiation mode; and
a power interruption mode.

3. The integrated circuit of claim 2 wherein the multiple events comprise at least one operational parameter of the synchronous logic being monitored as falling outside of an operational range.

4. The integrated circuit of claim 1 wherein the multiple events comprise at least one operational parameter of the synchronous logic being monitored as falling outside of an operational range.

5. The integrated circuit of claim 4 wherein the at least one operational parameter of the synchronous logic comprises at least one of the group consisting of:
a supply voltage threshold;
a supply voltage range;
a temperature threshold;
a temperature range;
a bus clock; and
at least one address error condition.

6. The integrated circuit of claim 4 wherein the non-clocked intelligent logic is arranged to identify when the synchronous logic is operating within a desired operational range and, in response thereto, place the microcontroller unit in a normal operational mode.

7. The integrated circuit of claim 4 wherein the non-clocked intelligent logic is arranged to force a configurable state on the microcontroller unit thereby autonomously initiating an alternate operational mode of the microcontroller unit.

8. The integrated circuit of claim 4 wherein a memory element and the non-clocked intelligent logic autonomously prevent access to the memory element by the synchronous logic.

9. The integrated circuit of claim 1 wherein the non-clocked intelligent logic is arranged to force a configurable state on the microcontroller unit thereby autonomously initiating the alternate operational mode of the microcontroller unit.

10. The integrated circuit of claim 1 wherein a memory element and the non-clocked intelligent logic autonomously prevent access to the memory element by the synchronous logic.

11. The integrated circuit of claim 1 wherein a clock source is arranged to generate a clock signal to be applied to a central processing unit operably coupled to the synchronous logic and non-clocked intelligent logic wherein, in response to the non-clocked intelligent logic autonomously monitor a clocked event, the non-clocked intelligent logic autonomously halts a synchronous clock signal applied to the central processing unit.

12. The integrated circuit of claim 1 wherein the non-clocked intelligent logic is arranged to autonomously disable parts of the synchronous logic by holding selected logic modules of the synchronous logic in a reset state.

13. The integrated circuit of claim 12 wherein the non-clocked intelligent logic holds one or more additional logic modules of the synchronous logic in a reset state by disabling one or more clock signal(s) applied to the one or more additional logic modules.

14. A method of operating a microcontroller unit in a single integrated circuit comprising synchronous logic operably coupled to non-clocked intelligent logic, wherein the method comprises:

monitoring autonomously whether multiple events associated with an operation of the synchronous logic are operating outside of an operational range of the synchronous logic and, in response thereto:

initiating autonomously an alternate operational mode for performing operational functions of the microcontroller unit; and selecting and enabling, in response to the non-clocked intelligent logic monitoring an event, synchronous logic that is capable of operating at a low operational supply voltage for one or more microcontroller unit applications.

15. An integrated circuit comprising:

a microcontroller unit having synchronous logic operably coupled to a supply voltage source, wherein the microcontroller unit comprises:

non-clocked intelligent power management logic operably coupled to the supply voltage source and arranged to monitor both a load of the microcontroller unit and an output current of the voltage source and in response thereto, the non-clocked intelligent power management logic is arranged to autonomously adapt a voltage regulator output current such that the monitored output current is adjusted to match the monitored load of the microcontroller unit, wherein the non-clocked intelligent power management logic comprises selective logic operably coupled to the synchronous logic, wherein in response to the non-clocked intelligent power management logic monitoring an event, the selective logic selects and enables synchronous logic that is capable of operating at a low operational supply voltage for one or more microcontroller unit applications.

16. The integrated circuit of claim 15 wherein the microcontroller unit comprises a central processing unit operably coupled to the supply voltage source, such that the non-clocked intelligent power management logic is arranged to autonomously pass control of the supply voltage source to the central processing unit when the supply voltage is within an operational range of the synchronous logic.

17. The integrated circuit of claim 15 wherein the non-clocked intelligent power management logic autonomously identifies at least one synchronous logic module within the microcontroller unit that require a voltage supply level to operate, and in response thereto, for one or more microcontroller application(s), enables those synchronous logic modules when the voltage supply level increases to the required level.

18. The integrated circuit of claim 15 wherein the non-clocked intelligent logic is arranged to detect whether a supply voltage applied to the synchronous logic has decreased below a threshold and, in response thereto, the selective logic is arranged to select and enable synchronous logic that is capable of operating at the supply voltage below the threshold for one or more respective microcontroller unit applications.

19. A method of operating a microcontroller unit in a single integrated circuit comprising: synchronous logic and non-clocked intelligent power management logic both operably coupled to a supply voltage source and a load of the microcontroller unit, the method comprising:

monitoring both a load of the microcontroller unit and an output current of the voltage source by the non-clocked intelligent power management logic, and in response thereto:

autonomously adapting a voltage regulator output current, by the non-clocked intelligent power management logic, such that the monitored output current is adjusted to match the monitored load of the microcontroller unit; and selecting and enabling, in response to the non-clocked intelligent power management logic monitoring an event, synchronous logic that is capable of operating at a low operational supply voltage for one or more microcontroller unit applications.

* * * * *